(12) United States Patent
El-Diraby et al.

(10) Patent No.: US 11,270,036 B2
(45) Date of Patent: Mar. 8, 2022

(54) SYSTEMS AND METHODS FOR SUSTAINABILITY AND SOCIAL INTERACTION ANALYSIS IN BUILDING INFORMATION MODELING

(71) Applicant: THE GOVERNING COUNCIL OF THE UNIVERSITY OF TORONTO, Toronto (CA)

(72) Inventors: Tamar El-Diraby, Mississauga (CA); Emmanouil Papangelis, Berkeley, CA (US); Thomas Krijnen, Eindhoven (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 18 days.

(21) Appl. No.: 16/625,323

(22) PCT Filed: Jun. 25, 2018

(86) PCT No.: PCT/CA2018/050779
§ 371 (c)(1),
(2) Date: Dec. 20, 2019

(87) PCT Pub. No.: WO2019/000083
PCT Pub. Date: Jan. 3, 2019

(65) Prior Publication Data
US 2021/0334422 A1   Oct. 28, 2021

Related U.S. Application Data

(60) Provisional application No. 62/525,388, filed on Jun. 27, 2017.

(51) Int. Cl.
*G06F 30/13* (2020.01)
*G06F 30/12* (2020.01)
(Continued)

(52) U.S. Cl.
CPC .............. *G06F 30/13* (2020.01); *G06F 30/12* (2020.01); *G06F 2111/02* (2020.01); *G06F 2119/08* (2020.01)

(58) Field of Classification Search
CPC ...... G06F 30/13; G06F 30/12; G06F 2119/08; G06F 2111/02; G06F 30/00
(Continued)

(56) References Cited

U.S. PATENT DOCUMENTS

| 7,912,807 B2 | 3/2011 | McLean et al. |
| 8,959,005 B2 | 2/2015 | Olsson et al. |

(Continued)

OTHER PUBLICATIONS

Osello, Anna et al. "Architecture Data and Energy Efficiency Simulations: BIM and Interoperability Standards", Nov. 14-16, 2011, 12th Conference of International Building Performance Simulation Association. (Year: 2011).*

(Continued)

*Primary Examiner* — Cedric Johnson
(74) *Attorney, Agent, or Firm* — Bhole IP Law; Anil Bhole; Marc Lampert

(57) ABSTRACT

Described herein are systems and methods for building information modeling. An embodiment of the method includes: receiving a BIM; and transforming the BIM to flatten solid-volume geometry for space bounding elements into thin-walled boundaries of the thermal zones by: determining wall volumes from the BIM; collapsing the wall volumes to provide single surface walls; determining wall center surfaces and end points from the single surface walls; aligning, and trimming or extending, the single surface walls using the wall end points to create closed spaces; connecting the closed spaces vertically to generate a single water tight volume for the closed spaces; and creating interfaces between the single water tight volume for the closed spaces to generate thermal zones.

18 Claims, 19 Drawing Sheets

(51) Int. Cl.
  *G06F 111/02* (2020.01)
  *G06F 119/08* (2020.01)
(58) Field of Classification Search
  USPC .......................................................... 703/1
  See application file for complete search history.

(56) References Cited

U.S. PATENT DOCUMENTS

| | | | |
|---|---|---|---|
| 2008/0249756 A1 | 10/2008 | Chaisuparasmikul | |
| 2013/0197868 A1* | 8/2013 | Olsson | G06K 9/00214 |
| | | | 703/1 |
| 2014/0025347 A1 | 1/2014 | Kim et al. | |
| 2016/0299997 A1 | 10/2016 | Mitchell et al. | |

OTHER PUBLICATIONS

L. Norford, R. Socolow, E.S. Hsieh, G. Spadaro, Two-to-one discrepancy between measured and predicted performance of a low-energy office building: insights from a reconciliation based on the doe-2 model, Energ. Buildings 21 (1994) 121-131, http://dx.doi.org/10.1016/0378-7788(94)90005-1.

A. Osello, G. Cangialosi, D. Dalmasso, A. Di Paolo, M.L. Turco, P. Piumatti, M. Vozzola, Architecture data and energy efficiency simulations: bim and inter-operability standards, proceedings of Building Simulation, 2011, pp. 2210-2217.

A.H. Oti, W. Tizani, Bim extension for the sustainability appraisal of conceptual steel design, Adv. Eng. Inform. 29 (2015) 28-46, http://dx.doi.org/10.1016/j.aei. 2014.09.001.

M. Papagelis, T.F. Krijnen, M. Elshenawy, T. Konomi, R. Fang, T.E. El-Diraby, Green2.0: enabling complex interactions between buildings and people, Proceedings of the 19th ACM Conference on Computer Supported Cooperative Work and Social Computing Companion, ACM, 2016, pp. 77-80, , http://dx.doi.org/10.1145/2818052.2874330.

M. Papagelis, V. Murdock, R. van Zwol, Individual behavior and social influence in online social systems, Proceedings of the 22nd ACM Conference on Hypertext and Hypermedia, ACM, 2011, pp. 241-250, , http://dx.doi.org/10.1145/1995966. 1995998.

J.H. Tah, H.F. Abanda, Sustainable building technology knowledge representation: using semantic web techniques, Adv. Eng. Inform. 25 (2011) 547-558, http://dx. doi.org/10.1016/j.aei.2011.02.006.

A. Tapiador, A. Fumero, J. Salvachua, S. Aguirre, A web collaboration architecture, Collaborative Computing: Networking, Applications and Worksharing, 2006. CollaborateCom 2006. International Conference on, IEEE, 2006, pp. 1-4, , http://dx. doi.org/10.1109/COLCOM.2006.361841.

J.E. Taylor, R. Levitt, Innovation alignment and project network dynamics: an in-tegrative model for change, Proj. Manag. J. 38 (2007) 22-35, http://dx.doi.org/10. 1002/pmj.20003.

M. Turner, D. Budgen, P. Brereton, Turning software into a service. Computer. 36 (2003) 38-44, http://dx.doi. org/10.1109/MC.2003.1236470.

A. Van Herzele, Local knowledge in action: valuing nonprofessional reasoning in the planning process, J. Plan. Educ. Res. 24 (2004) 197-212, http://dx.doi.org/10.1177/0739456X04267723.

J.K.W. Wong, J. Zhou, Enhancing environmental sustainability over building life cycles through green bim: a review, Autom. Constr. 57 (2015) 156-165, http://dx. doi.org/10.1016/j.autcon.2015.06.003.

K. Wong, H. Unsal, J.E. Taylor, R.E. Levitt, Global dimension of robust project network design, J. Constr. Eng. Manag. 136 (2009) 442-451, http://dx.doi.org/10. 1061/(ASCE)CO.1943-7862.0000143.

R.J. Yang, P.X. Zou, Stakeholder-associated risks and their interactions in complex green building projects: a social network model, Build. Environ. 73 (2014)208-222, http://dx.doi.org/10.1016/j.buildenv.2013.12.014.

N. Yu, Y. Jiang, L. Luo, S. Lee, A. Jallow, D. Wu, J.I. Messner, R.M. Leicht, J. Yen, Integrating bimserver and openstudio for energy efficient building, Proceedings of 2013 ASCE International Workshop on Computing in Civil Engineering, 2013, pp. 516-523.

J. Feringa, T. Krijnen, BIM for robotic manufacturing, Proceedings of the International Association for Shell and Spatial Structures (IASS) Symposium, 2015, pp. 1-11.

Philipp Rode, et al., Buildings: investing in energy and resource efficiency, 2013.

Tamer El-Diraby, et al., BIM-based collaborative design and socio-technical analytics of green buildings, 2017.

Tamer El-Diraby, et al., Sus-tweet-ability:Exposingpubliccommunity'sperspective on sustainabilityof urbaninfrastructurethroughonlinesocialmedia, 2016.

T.E. El-Diraby, et al., Customizing information delivery to project stakeholders in the smart city, 2018.

F.H. Abanda, J.H. Tah, R. Keivani, Trends in built environment semantic web applications: where are we today? Expert Syst. Appl. 40 (2013) 5563-5577.

M. Al Hattab, F. Hamzeh, Using social network theory and simulation to compare traditional versus bim—lean practice for design error management Autom. Constr. 52 (2015) 59-69.

Z. Alwan, D. Greenwood, B. Gledson, Rapid LEED evaluation performed with bim based sustainability analysis on a virtual construction project, Constr. Innov. 15 (2015) 134-150.

M.R. Asl, S. Zarrinmehr, M. Bergin, W. Yan, Bpopt: a framework for bim-based performance optimization, Energy Build. 108 (2015) 401-412.

V.. Bazjanac, A. Kiviniemi, Reduction, simplification, translation and interpretation in the exchange of model data, Proceedings of the CIB-W78 24th International Conference, 2007, pp. 163-168.

B. Becerik-Gerber, S. Rice, The perceived value of building information modeling in the US building industry, ITcon 15 (2010) 185-201.

J. Beetz, L. van Berio, R. de Laat, P. van den Helm, Bimserver.org—an open source ifc model server, Proceedings of the CIP W78 conference, 2010 2-2.

L. van Berio, T. Krijnen, Using the bim collaboration format in a server based workflow, Procedia Environ. Sci. 22 (2014) 325-332, http://dx.doi.org/10.1016/j. proenv.2014.11.031.

M. Bilal, L.O. Oyedele, J. Qadir, K. Munir, S.O. Ajayi, O.O. Akinade, H.A. Owolabi, H.A. Alaka, M. Pasha, Big data in the construction industry: a review of present status, opportunities, and future trends, Adv. Eng. Inform. 30 (2016) 500-521, http://dx.doi.org/10.1016/j.aei.2016.07.001.

P.M. Bosch-Sijtsema, L.H. Henriksson, Managing projects with distributed and embedded knowledge through interactions, Int. J. Proj. Manag. 32 (2014) 1432-1444, http://dx.doi.org/10.1016/j.ijproman.2014.02.005.

P. Bynum, R.R. Issa, S. Olbina, Building information modeling in support of sus-tainable design and construction, J. Constr. Eng. Manag. 139 (2012) 24-34, http://dx. doi.org/10.1061/(ASCE)CO.1943-7862.0000560.

P. Chinowsky, J. Diekmann, V. Galotti, Social network model of construction, J. Constr. Eng. Manag. 134 (2008) 804-812, http://dx.doi.org/10.1061/(ASCE)0733-9364(2008)134:10(804).

J. Corbum, Bringing local knowledge into environmental decision making: im-proving urban planning for communities at risk, J. Plan. Educ. Res. 22 (2003) 420-433, http://dx.doi.org/10.1177/0739456X03022004008.

G. Costa, L. Madrazo, Connecting building component catalogues with bim models using semantic technologies: an application for precast concrete components, Autom. Constr. 57 (2015) 239-248, http://dx.doi.org/10.1016/j.autcon.2015.05. 007.

M. Das, J.C. Cheng, S. Shiv Kumar, Bimcloud: a distributed cloud-based social bim framework for project collaboration, Computing in Civil and Building Engineering (2014), 2014, pp. 41-48, , http://dx.doi.org/10.1061/9780784413616.006.

M.K. Di Marco, J.E. Taylor, P. Alin, Emergence and role of cultural boundary spanners in global engineering project networks, J. Manag. Eng. 26 (2010)123-132, http://dx.doi.org/10.1061/(ASCE)ME.1943-5479.0000019.

(56) References Cited

OTHER PUBLICATIONS

C. Durugbo, A. Tiwari, J.R. Alcock, Modelling information flow for organisations: a review of approaches and future challenges, Int. J. Inf. Manag. 33 (2013) 597-610, http://dx.doi.org/10.1016/j.ijinfomgt. 2013.01.009.
C. Eastman, C.M. Eastman, P. Teicholz, R. Sacks, BIM Handbook: A Guide to Building Information Modeling for Owners, Managers, Designers, Engineers and Contractors, John Wiley & Sons, 2011.
T. El-Diraby, B. Wang, E-society portal: integrating urban highway construction projects into the knowledge city, J. Constr. Eng. Manag. 131 (2005) 1196-1211, http://dx.doi.org/10.1061/(ASCE)0733-9364(2005)131:11(1196).
T.E. El-Diraby, T.F. Krijnen, M. Papagelis, Green2.0: sociotechnical analytics of green buildings, Proceedings of the International Conference on Smart Infrastructure and Construction, ICE, 2016, pp. 551-556, , http://dx.doi.org/10.1680/tfitsi.61279.551.
N.M. El-Gohary, T.E. El-Diraby, Domain ontology for processes in infrastructure and construction, J. Constr. Eng. Manag. 136 (2010) 730-744, http://dx.doi.org/10.1061/(ASCE)CO.1943-7862. 0000178.
EPA, Environmental Protection Agency: "Green Building". (2015) https://archive. epa.gov/greenbuilding/web/html/ Accessed Jul. 12, 2015.
A. Feige, H. Wallbaum, S. Krank, Harnessing stakeholder motivation: towards a swiss sustainable building sector, Build. Res. Inf. 39 (2011) 504-517, http://dx.doi. org/10.1080/09613218.2011.589788.
R.T. Fielding, Architectural Styles and the Design of Network-based Software Architectures, Ph.D. thesis, University of California, Irvine, 2000.
D. Gomes, P. Tzortzopoulos, M. Kagioglou, Collaboration through shared under-standing in the early design stage, 24th Ann. Conf, of the Int'l. Group for Lean Construction, Boston, MA, USA, Jul. 20-22, 2016, pp. 63-72.
V. Gómez, A. Kaltenbrunner, V. López, Statistical analysis of the social network and discussion threads in slashdot, Proceedings of the 17th international conference on World Wide Web, ACM, 2008, pp. 645-654, , http://dx.doi.org/10.1145/1367497.1367585.
A. Gupta, A. Cemesova, C.J. Hopfe, Y. Rezgui, T. Sweet, A conceptual framework to support solar pv simulation using an open-bim data exchange standard, Autom. Constr. 37 (2014) 166-181, http://dx.doi.org/10.1016/j.autcon.2013.10.005.
A.J. Hoffman, R. Henn, Overcoming the social and psychological barriers to green building, Organ Environ. 21 (2008) 390-419, http://dx.doi.org/10.1177/ 1086026608326129.
B. Ilhan, H. Yaman, Green building assessment tool (gbat) for integrated bim-based design decisions, Autom. Constr. 70 (2016) 26-37, http://dx.doi.org/10.1016/j. autcon.2016.05.001.
F. Jalaei, A. Jrade, Integrating building information modeling (bim) and LEED system at the conceptual design stage of sustainable buildings, Sustainable Cities Soc. 18 (2015) 95-107, http://dx.doi. org/10.1016/j.scs.2015.06.007.
Y.S. Jeong, C. Eastman, R. Sacks, I. Kaner, Benchmark tests for bim data exchanges of precast concrete, Autom. Constr. 18 (2009) 469-484, http://dx.doi.org/10. 1016/j.autcon.2008.11.001.
E.P. Karan, J. Irizarry, Extending bim interoperability to preconstruction operations using geospatial analyses and semantic web services, Autom. Constr. 53 (2015) 1-12, http://dx.doi.org/10.1016/j. autcon.2015.02.012.
J.B. Kim, W. Jeong, M.J. Clayton, J.S. Haberl, W. Yan, Developing a physical bim library for building thermal energy simulation, Autom. Constr. 50 (2015) 16-28, http://dx.doi.org/10.1016/j.autcon. 2014.10.011.
S. Koeppel, D. Ürge-Vorsatz, Assessment of Policy Instruments for Reducing Greenhouse Gas Emissions from Buildings, (2007).
M. König, J. Dimbek, V. Stankovski, Architecture of an open knowledge base for sustainable buildings based on linked data technologies, Autom. Constr. 35 (2013) 542-550, http://dx.doi.org/ 10.1016/j.autcon.2013.07.002.
S. Kota, U.S. Haberl, M.J. Clayton, W. Yan, Building information modeling (bim)-based daylighting simulation and analysis, Energ. Buildings 81 (2014) 391-403, http://dx.doi.org/10.1016/j.enbuild. 2014.06.043.
T. Krijnen, M. Tamke, Assessing implicit knowledge in bim models with machine learning, Modelling Behaviour, Springer, 2015, pp. 397-406, , http://dx.doi.org/ 10.1007/978-3-319-24208-8_33.
K.R. Lakhani, L.B. Jeppesen, P.A. Lohse, J.A. Panetta, The Value of Openness in Scientific Problem Solving, Division of Research, Harvard Business School, 2007.
K.R. Lakhani, J.A. Panetta, The principles of distributed innovation, Innovations 2 (2007) 97-112, http://dx.doi.org/10.1162/itgg.2007.2. 3.97.
A. Leff, J.T. Rayfield, Web-application development using the model/view/con-troller design pattern, Enterprise Distributed Object Computing Conference, 2001. EDOC'01. Proceedings. Fifth IEEE International, IEEE, 2001, pp. 118-127.
H. Lin, J.A. Harding, A manufacturing system engineering ontology model on the semantic web for inter-enterprise collaboration, Comput. Ind. 58 (2007) 428-437, http://dx.doi.org/10.1016/j.compind.2006. 09.015.
T. Maile, J. O'Donnell, V. Bazjanac, C. Rose, Bim-geometry modelling guidelines for building energy performance simulation, Building Simulation Conference, 2013, pp. 3242-3249.
W. Mazairac, J. Beetz, Bimql—an open query language for building information models, Adv. Eng. Inform. 27 (2013) 444-456, http:// dx.doi.org/10.1016/j.aei. 2013.06.001.
A.P. Neghab, A. Etienne, M. Kleiner, L. Roucoules, Performance evaluation of col-laboration in the design process: using interoperability measurement, Comput. Ind. 72 (2015) 14-26, http://dx.doi. org/10.1016/j.compind.2015.03.011.
M.E. Newman, The structure of scientific collaboration networks, Proc. Natl. Acad. Sci. 98 (2001) 404-409, http://dx.doi.org/10.1073/ pnas.98.2.404.
M. Niknam, S. Karshenas, Sustainable design of buildings using semantic bim and semantic web services, Procedia Eng. 118 (2015) 909-917, http://dx.doi.org/10. 1016/j.proeng.2015.08.530.
First Office Action of corresponding Chinese Patent Application No. 201880047289.9, dated Jun. 11, 2021.

\* cited by examiner

SYSTEMS AND METHODS FOR SUSTAINABILITY AND SOCIAL INTERACTION ANALYSIS IN BUILDING INFORMATION MODELING

TECHNICAL FIELD

The following relates generally to systems and methods for building information modeling, and more particularly to methods for sustainability and social interaction analysis in building information modeling systems.

BACKGROUND

As the world is experiencing a period of extreme urbanization, professionals and researchers of the AEC (Architectural, Engineering & Construction) industry, as well as, public policy makers are challenged by the increasing complexity and need to improve our understanding of the social, technical and business dimensions of green building design. Green building design (or sustainable building design) refers to the process of designing buildings (or other facilities) that are environmentally responsible and resource-efficient throughout a building's life-cycle. This typically requires close cooperation of the design team, the architects, the engineers, and the rest of the stakeholders (clients, manufacturers, contractors) at all project stages. However, current common practice assumes that semantic building model information is typically not existing or not available online (i.e., it lies in local repositories and is typically accessible through proprietary stand-alone desktop software). Moreover, sharing of building project information is either not feasible or done in a way or at a level that is considered inadequate and inefficient, such as through email, paper printouts or other traditional channels of information exchange. Therefore, the scope of collaboration and analysis is typically still limited to single projects in isolation and valuable knowledge about functioning of the various teams is lost in ad-hoc decentralized and traditional forms of communication.

The impact of the AEC industry on the environment is substantial. Manufacturing building materials account for 10% of global energy usage; the operation phase produces at least 30% of all greenhouse gas emissions; and, demolishing buildings is responsible for 40% of all solid waste. Therefore, designing more sustainable buildings is of vital societal importance. In addition, successfully engaging citizens in early phases of building design decisions, and educating them about the various design tradeoffs acts as a catalyst for embracing such buildings in a community, ensuring their longer life.

SUMMARY

In an aspect, there is provided a method for transforming a BIM (building information model) from a decomposition of individual components with solid-volume geometrical representations to thermal zones for use in energy analysis, the method comprising: receiving a BIM; transforming the BIM to flatten solid-volume geometry for space bounding elements into thin-walled boundaries of the thermal zones by: determining wall volumes from the BIM; collapsing the wall volumes to provide single surface walls; determining wall center surfaces and end points from the single surface walls; aligning, and trimming or extending, the single surface walls using the wall end points to create closed spaces; connecting the closed spaces vertically to generate a single water tight volume for the closed spaces; and creating interfaces between the single water tight volume for the closed spaces to generate thermal zones; and outputting the thermal zones.

In a particular case, the BIM model is received in IFC format.

In another case, the method further comprising receiving a selection of a subset of the BIM for transforming.

In yet another case, the method further comprising determining any openings of the wall volumes and generating subsurfaces for the determined openings to approximate for the detailed geometry of wall openings.

In yet another case, outputting the thermal zones comprises displaying the thermal zones to a user.

In yet another case, the method further comprising displaying to the user at least one of the wall volumes, the single surface walls, the wall center surfaces and end points, the create closed spaces, and the single water tight volume.

In yet another case, trimming the single surface walls using the wall end points to create closed spaces comprises constructing halfspace solids from the wall center surfaces to be used to trim the single surface walls, the halfspace solid is a solid that divides the Cartesian space into two sets on either side of the single surface wall.

In yet another case, connecting the closed spaces vertically to generate the single water tight volume comprises constructing a plurality of slabs each bounded by projections of boundaries of the single surface walls.

In yet another case, the method further comprising collapsing the slabs to provide single surface slab faces.

In yet another case, the extending of the single surface walls comprises extending the single surface walls in at least one of the vertical and horizontal planes.

In another aspect, there is provided a system for transforming a BIM (building information model) from a decomposition of individual components with solid-volume geometrical representations to thermal zones for use in energy analysis, the system comprising a processing unit and storage unit, the processing unit being configured to: receive a BIM from the storage unit; transform the BIM to flatten solid-volume geometry for space bounding elements into thin-walled boundaries of the thermal zones by: determining wall volumes from the BIM; collapsing the wall volumes to provide single surface walls; determining wall center surfaces and end points from the single surface walls; aligning and trimming the single surface walls using the wall end points to create closed spaces; connecting the closed spaces vertically to generate a single water tight volume for the closed spaces; and creating interfaces between the single water tight volume for the closed spaces to generate thermal zones; and output the thermal zones.

In a particular case, the BIM model is received in IFC format.

In another case, the processing unit is further configured to receive a selection of a subset of the BIM for transforming.

In yet another case, the processing unit is further configured to determine any openings of the wall volumes and generating subsurfaces for the determined openings to approximate for the detailed geometry of wall openings.

In yet another case, outputting the thermal zones comprises displaying the thermal zones to a user via a user device.

In yet another case, the processing unit is further configured to output and display to the user, via the user device, at least one of the wall volumes, the single surface walls, the wall center surfaces and end points, the create closed spaces, and the single water tight volume.

In yet another case, trimming the single surface walls using the wall end points to create closed spaces comprises constructing halfspace solids from the wall center surfaces to be used to trim the single surface walls, the halfspace solid is a solid that divides the Cartesian space into two sets on either side of the single surface wall.

In yet another case, connecting the closed spaces vertically to generate the single water tight volume comprises constructing a top slab and a bottom slab each bounded by projections of boundaries of the single surface walls.

The system of claim 18, the processing unit is further configured to collapse the slabs to provide single surface slab faces.

the processing unit is further configured to the extending of the single surface walls comprises extending the single surface walls in at least one of the vertical and horizontal planes.

These and other aspects are contemplated and described herein. It will be appreciated that the foregoing summary sets out representative aspects of systems and methods for building information modeling to assist skilled readers in understanding the following detailed description.

DESCRIPTION OF THE DRAWINGS

A greater understanding of the embodiments will be had with reference to the Figures, in which:

FIG. 3A to 3D show user interface screens of the system, wherein FIG. 3A shows an original building model; FIG. 3B shows product listing and substitution; FIG. 3C shows a building model with a substituted element; FIG. 3D shows an example sustainability report of a model.

FIG. 5A to 5H show schematic representations of steps of the method for geometry simplification, wherein FIG. 5A shows receiving a BIM module (e.g. in IFC format), and FIG. 5B shows selecting a subset of the space for analysis. Further, FIGS. 5C-H show results of transformation steps, wherein FIG. 5C shows the bounding of walls; FIG. 5D shows centered faces; FIG. 5E shows adjusted faces; FIG. 5F shows trimmed faces; FIG. 5G shows all spaces; FIG. 5H shows the final thermal zone results;

FIG. 7A to 7D show example analytics provided in the system by the social interactions module, wherein FIG. 7A shows a distribution of project comments by type according to the bcfXML-v1 open standard, FIG. 7B shows a distribution of project comments over time, FIG. 7C shows an example project-level network (PN), and FIG. 7D shows a visualization of trending discussions (element-level networks (EN));

DETAILED DESCRIPTION

Figure 1:
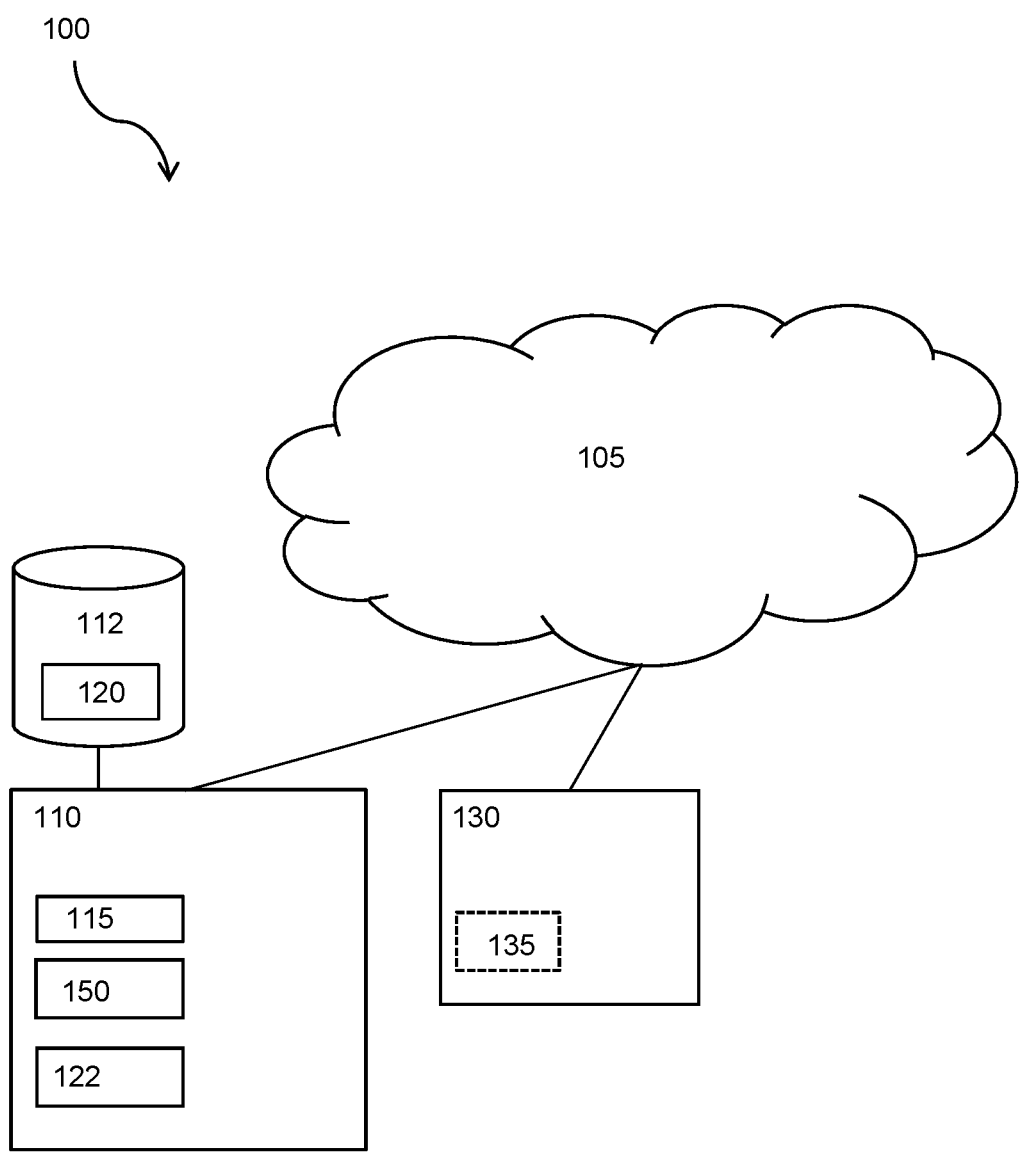
FIG. 1 shows a system for building information modeling.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic discs, optical discs, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile discs (DVD) or other optical storage, magnetic cassettes, magnetic tape, magnetic disc storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

A Building Information Model (BIM) is a digital representation of physical and functional characteristics of a building project. Each object in a real building is represented by an equivalent digital object in a BIM. These objects are characterized by geometrical representations and semantic and relational metadata. BIM software is used by professionals, businesses and government agencies who plan, design, construct, operate and maintain diverse physical infrastructures.

As used herein, BIM means Building Information Modeling or Building Information Model as the context indicates. IFC means Industry Foundation Classes. BCF means BIM Collaboration Framework.

BIM is often associated with the Industry Foundation Classes (IFC) model. The IFC model specification is an open standard registered by ISO as an official International Standard ISO 16739:2013. It is a platform-neutral, object-based stuctured file format that is intended to describe building and construction industry data. Contemporary BIM software provides an option to export a BIM model to the IFC file format. A typical IFC file consists of thousands of lines that adhere to the IFC model and can consume hundreds of MBs, or sometime GBs in a hard drive. IFC plays critical role in the design of the architecture of the system described herein, as it offers interoperability among BIM models that have been developed using different BIM software. By sharing all information in one open format, such as IFC, all building project actors can access relevant information when they need so that everyone can work efficient together.

The changing trends in the use of Web technologies that aim to enhance interconnectivity, interoperability and information sharing are transforming the way in which information is accessed and disseminated online. Most importantly, availability of new standards, methods, tools and strategies that are enabled by emerging technologies in the domain of AEC provide new ways of sharing and working with BIMs. Designing and developing services that provide a data-driven approach to operate on building projects, is therefore, a global imperative and defines a number of research and engineering challenges and opportunities.

Applicant finds that the confluence of modular web services and BIM as a design paradigm provides the means to reduce the energy footprint of the building life cycle, through improved social interaction and sustainable energy analysis.

As BIM evolves into becoming the central means for coordinating project design and planning activities, there are a few limitations/opportunities in the way current BIM tools address the needs for integrated design, collaboration and analysis (the initial objective of BIM). First, substantial communications and interactions about the design exist outside the BIM environment—typically in e-mail formats. This may cause distractions, delays to the project, and could waste valuable knowledge (contained in these interactions). Second, the need of engaging end-users and their keen interest in selecting "green" features. Professionals can develop different designs that achieve varying levels of energy conservation, but these will always require changes based on usage patterns, making it essential that end-users are engaged in the design process early on and they receive adequate information/education before making decisions in order to overcome adoption barriers.

Typical problems that are encountered as a result of current manners of communication range from the use of inappropriate media, a failure to interpret the associated semantics and a limited effectiveness to the inability to reach the right person. In many cases, less optimal designs or even errors are explicitly attributed to a lack of vertical communication, between successive entities (within the project design and management supply chain), and poor horizontal communication between individual team members within the same entity.

Therefore, there is need for collaborative design of BIM in an integrated environment—one that can engage not only the professionals, but also non-expert end-users.

Furthermore, current common practice is to perform sustainability/energy efficiency simulations after the design stage. As such, design-simulation iterations are slow and operate on disjoint models, hampering sustainable design. BIM technology has been developed and promoted as means to integrate all information of building designs. However, it is overly focused on the traditional design of facilities, i.e. not green-oriented. Designers and operators have to use an increasing set of heterogeneous software systems to complement the missing features in BIM, facing multitude of challenges in relation to interoperability and data integrity. With the increasing size and sophistication of BIM files and the increasingly iterative development cycles, the burdens of transferring data between software and the management of design changes is hindering fuller analysis. It has been found that the top three BIM functions are visualization, clash detection, and creation of as-built models. While most professionals believed that sustainability analysis is of great importance, they didn't consider it to be a priority of the BIM agenda. More alarming, researchers in green buildings found that BIM-based energy management is still an immature domain. More recently, the integration of sustainability assessment and BIM has attracted attention; however, these typically operate on specific sustainability measures, such as heat accumulation due to lighting or placement of photo voltaic cells or provide limited options to transfer the full semantics encapsulated in a building information model. Other approaches are directed at quantitative scoring mechanisms to evaluate building performance as a whole; an approach has been described in which output from BIM authoring tools is enriched with a predefined set of manually assessed building characteristics related to the building research establishment environmental assessment method (BREEAM) environmental assessment method. Similar research has been conducted for other assessment methods, such as leadership in energy and environmental design (LEED).

Therefore, there is further a need for improved sustainability analysis within the context of a BIM integrated environment.

The advent of modern web technologies, such as cloud computing, web services and the semantic web have the potential to shape future online collaborative environments. BIM carries potential towards implementing more sustainable design construction and operation. In particular, the need for comprehensive web-based tools and integration of design, construction and facility management stages as a crucial pillar to reduce carbon emissions. The BIM paradigm constitutes a shift from designs as collections of two-dimensional sets of lines, into models in which buildings are represented as machine readable knowledge models. This paves the way for an automatic assessment of sustainability throughout the entire design cycle. In addition, there is a need to expose this in an online context, as evidenced by a body of RESTful APIs, web-services and interlinked semantic web ontologies that help information exchange across heterogeneous representations of building data and disciplines. Consequently, standards and services are originating around BIM that enable a more collaborative context. Exposure of such systems on the web enables more detailed analysis of stakeholder interaction and the evaluation of design processes. Moreover, researchers have developed models to analyze the networked nature of project internal actors. Others have considered the impact of project internal networks on the evolution of project scope. The most advanced approach is the proposal by Chinowsky to model construction projects as social networks. Van Herzele found that inclusion of non-expert knowledge was beneficial to the planning process given that the diversity of perspectives (especially of those who are outside of the professional bubble) can (re)discover creative solutions. In fact, citizen science often results in superior solutions. Further, such solutions are by default, context-sensitive.

As described in more detail below with reference to the figures, systems and methods of building information modeling described herein provide a data-driven approach to building planning, construction and maintenance for BIM. Embodiments of a sustainability analysis module, connects BIM to energy analysis software to allow users to select different products from a catalog and assess the impact of each on energy consumption. More particularly, the sustainability analysis module provides methods for automating sustainability analysis of buildings within the context of BIM by providing a geometrical translation process that enables linking IFC models to sustainability analysis libraries, and permitting real-time comparison of sustainability analysis of design changes on the web interface of a BIM system without having to go through redesigns. Further, embodiments of a social interaction module provide methods for managing interactions between buildings and people and for analyzing the dynamics of information and collaboration networks. It allows participants (end-users or professionals) to comment and share views about building designs. Social network analysis and semantic modeling tools are then used to extract information and insights from these interactions. The social interaction module thus advances the current state of the art by bringing about a fundamental shift in the way that AEC professionals, end-users and public policy makers work together throughout a building's lifecycle.

The described building information modeling system, optionally designed as an open platform, provides access to information that enables researchers and practitioners to build new, more efficient theories and methods of building design. By providing new insights into the building design process it is likely to have a profound beneficial effect for both AEC professionals and the society at large.

With respect to the sustainability analysis module, as described more particularly below with reference to the figures, current BIM models are large and complex yet currently have little focus on green-oriented features. A solution that merely expands IFC (Industry Foundation Classes) to encapsulate all data related to green design, would compound the data management tasks. The sustainability analysis module described herein offers a more preferable solution that can loosely couple BIM and independent third-party building energy analysis software and libraries, such as OpenStudio, without forcing a full merge. The linkage provided by the sustainability analysis module makes consideration of energy usage easy-allowing for an early-stage and iterative consideration. The bridge developed between IFC and third-party energy efficiency software would not be meant to provide a 100% accuracy in analysis (more fundamental and substantial rethinking of product models is needed before that). Rather, the described module presents a novel, scalable method to provide automated, fast and highly accurate means to compare the energy performance of alternative designs and model features. It provides an adequate level of analysis with the end-user as a main target (i.e. so that the end-user can test/compare the approximate energy performance of two or more alternatives to support their educated-input or decision making).

With respect to the social interaction module, as described more particularly below with reference to the figures, embodiments described herein provide means to capture user input by integrating a commenting and annotation tool into BIM technology. Unlike existing tools, the communication model proposed benchmarks social and information network systems and is semantically rich. Recording and tracking comments by all users (professional or non-experts) is coupled with a full analysis of the resulting social and information network structure and data, which allows to understand the social connections between participating stakeholders and the dynamics of their communication. In the era of the knowledge economy, these networks and user-generated data constitute a rich source of creative ideas regarding design/operations plans. Indeed, this could provide the spark for a new realm in innovation democratization and bottom-up decision making.

By way of overview of functionality, the system enables online socio-technical analysis of green buildings in an integrated environment. In particular, the described building information modeling system brings about a fundamental shift in the investigation and assessment of green buildings by providing, through various modules:

Efficient BIM Management, by providing an online BIM management system that enables the efficient storage, indexing, querying and visualization of BIM elements on the Web.

Online Sharing and Collaboration of BIM, by providing an integrated environment for uploading, sharing and commenting on building information models. This enables meaningful distributed online communication and collaboration of researchers and professionals of the AEC industry, but also non-expert end-users.

On-demand Energy Efficiency Analysis, utilizing the sustainability analysis module, by providing an integrated on-demand energy efficiency analysis for buildings that enables researchers and professionals to better study and understand the complexity of building sustainability, suggest alternatives of design options, and develop new more efficient design processes.

Real-time Social Network Analytics, utilzing the social interaction module, by providing mining and analysis of the collaboration data and information networks that become available in the system to reveal interesting patterns of communication. Visualization of these patterns in a meaningful way can help researchers and professionals to identify, re-design and optimize business processes, discover synergies, streamline the workflows of different stakeholders, as well as, to optimize information flow between decision makers.

Monitoring of BIM-enabled Business Processes, by providing an integrated environment to analyze and improve industry performance by monitoring, storing and visualizing business processes that occur during the building design and collaboration procedures.

A Sandbox for BIM Developers & Researchers, by providing to researchers and third-party developers access (through a RESTful API) to a repository of (i) building information models, (ii) BIM-related communication and social analytics, (iii) Energy efficiency analysis reports, (iv) BIM-related business processes.

The described systems takes BIM from the realm of a stand-alone proprietary software into the realm of a sociallyaware collaborative service for decision making. It gives users (professionals and non-experts) the controls of BIM software in order to suggest, choose, assess and innovate new means to design, build and operate their facilities.

Embodiments of the systems and methods will now be described with reference to the figures.

Referring now to FIG. 1, shown therein is an embodiment of a system for building information modeling. The BIM system 100 comprises a server 110 and a user device 130. The system 100 described herein advances multi-disciplinary collaboration, socio-technical analysis, comprehensive simulation and stakeholder participation in an integrated and comprehensive web-based environment towards the goal of sustainable building design.

The server 110 comprises or is communicatively linked to a storage unit, such as database 112 for storing data 120. The server may be a hardware server, or may be a virtualized server. The data 120 generally comprises BIM models and associated data, as well as data relating to social interactions with BIM models, including emails, user comments, annotations, etc. The data may further comprise user information for users of the system, such as user credentials.

The server 110 comprises a processing unit, such as a processor for processing data 120 in conjunction with computer/executable instructions for providing the functionality described herein. The server has a front-end comprising user interface 115 setting out various services accessible over a network 105 via a web interface, many of which are effected by operations occurring on data at the back-end. Network 105 may be a wired or wireless communication network. The server back end comprises core infrastructure 150 and component modules 122.

Core infrastructure 150 includes service 142 (for implementing the user interface 115) and BIM management module 144 (for enabling managing and visualizing BIM). Service 142 and BIM management module 144 integrate to provide core infrastructure 150, providing the core of the web service offered by system 100.

Figure 2:
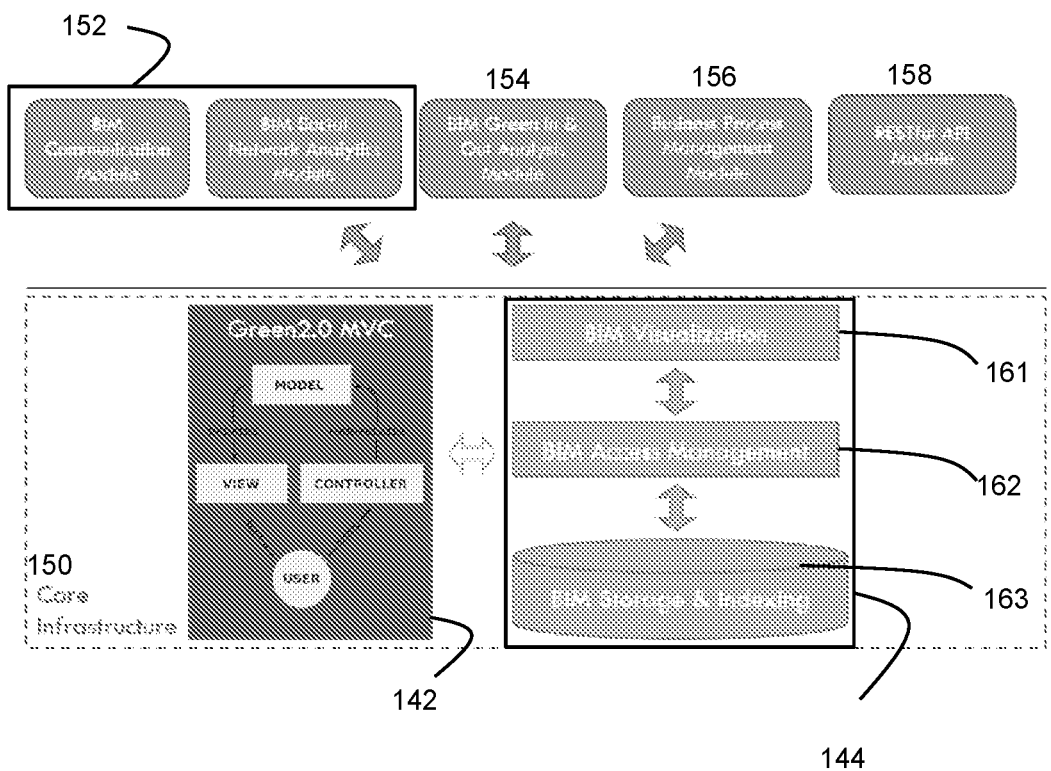
FIG. 2 shows modules of the system for building information modeling.

In order to better facilitate the SaaS model, the system 100 comprises one or more loosely coupled independent component modules 122 integrated on server 110 to deliver the described functionality. FIG. 2 illustrates the modules and how they relate to each other. Modules are provided to support domain functionality and may include social interaction module 152 (illustrated as a BIM communication module and BIM social network analytics module), sustainability analysis module 154, business process management module 156, and RESTful API module 158.

BIM stakeholders, design professionals, engineers, architects and building users are described above, and are referred to generally herein as "users" of system 100. Users may each access the server 110 over a computing device 130, though different users may have different access privileges, for example differential access to services (e.g. editing, commenting on BIMs). The users may have to input user credentials to the web interface before being able to access functionality of the system.

The high-level system architecture of system 100 thus emphasizes optionally separating the functionality of the system into independent, interchangeable modules, such that each contains everything necessary to execute only one aspect of the desired functionality. With modular programming, concerns are separated such that modules perform logically discrete functions, interacting through well-defined interfaces with the core architecture. Accordingly, though described in many instances, as part of a BIM system, various modules, including modules 152 and 154 may be provided independently thereof.

In many embodiments, the system follows a software delivery model known as Software-as-a-Service (SaaS). Conforming to this model, a single centrally hosted version of the application is deployed to server 110, with a single configuration (hardware, network, operating system) and users of the system typically access the software using a thin client (i.e., web browser) from user device 130, through a web-based user interface. The SaaS model overcomes many limitations that constrain traditional software use, deployment, and evolution and as the software is globally accessible online, collaboration among users becomes easier. In addition, the SaaS model is a suitable model for supporting integration with third-party protocols and application programming interfaces (APIs), making it easier to combine data, presentation and functionality from multiple services (e.g., cloud services). Though the system is described in many instances for simplicity as being provided in a SaaS configuration, it will be appreciated that other configurations are possible; for example, a client-side application 135 at user device 130 may be provided to interact with the server 110 over the web to provide the same functionality as a web-based application as described herein, alternatively a localized on-site application may be provided, with some modifications that will be appreciated to those of skill in the art.

An embodiment of the core infrastructure 150 will now be described in additional depth. Specifically, example embodiments of service 142 and 144 will be described in more detail while presenting possible architectural design of their programming components, as well as implementation details, interchange protocols and programming challenges. The other illustrated modules will described subsequently herein.

The service 142 is a core part of the system 100's infrastructure. It is a web service that may be based on a Model-View-Controller (MVC) web architecture. MVC is a popular software architectural pattern for implementing user interfaces. It divides a given software application into three interconnected parts, so as to separate internal representations of information from the ways that information is presented to or accepted from the users. This module is responsible for managing all user interactions and domain-specific functionality. It is also responsible for integrating with BIM management module 142, including any BIM open source technologies comprised therein, and facilitating the communication with the various independent components of the system.

The BIM management module 144 enables efficient management and visualization of BIM models. Towards this end, the system may rely on a number of tightly-knit open source technologies as now described. It will be appreciated that though a particular configuration is described, other embodiments are contemplated to provide the same functionality of the module 144 with different underlying technologies.

BIM storage and indexing, shown by element 163, may be provided by BIMServer as presented by Beetz, J., van Berlo, L., de Laat, R., van den Helm, P., 2010, Bimserver.org—an open source ifc model server, in: Proceedings of the CIP W78conference. BIMServer enables the system to centralize the information of a building design project. The core of the software is based on the open standard IFC (Industry Foundation Classes) and therefore knows how to handle IFC data. The BIMserver is not a fileserver, but uses the model-driven architecture approach. This means that IFC data are interpreted by a core-object and stored in an underlying database (BerkeleyDB, which is a family of embedded key-value database libraries providing scalable high-performance data management services to applications. The BerkeleyDB products use simple function-call APIs for data access and management.). The main advantage of this approach is the possibility to query, merge and filter the BIM-model and generate IFC files on the fly.

BIM Access Management, shown by element 162, comprises service interfaces, a set of defined interfaces for interaction with BIMserver. These interfaces are defined as (heavily annotated) Java interfaces. All interfaces with namespace org.buildingsmart.bimsie1 are implementations of the BIM Service Interface Exchange standard (BIMsie, https://buildingsmart.github.io/BIMSie/). All calls in the org.bimserver namespace are BIMServer specific calls. In this embodiment, the system uses a JavaScript Object Notation (JSON) interface (one of the three available channels to access BIMServer, along with SOAP and Protocol Buffers) to access the methods of the Service Interfaces. The JSON interface is mainly there to facilitate connecting to the BIMServer from web applications/web sites. An alternative way to access IFC elements stored in BIMServer is offered by BimQL (Mazairac, W., Beetz, J., 2013, Advanced Engineering Informatics 27, 444-456.). BimQL (BIM Query Language) is an open, domain specific query language for Building Information Models. The query language is intended for selecting and updating data stored in IFC models and in an embodiment it is implemented on top of the BIMServer. In this particular embodiment of system 100, there would not be support for querying of a BIM model through BimQL.

BIM Visualization, shown by element 161, may utilize BIMSurfer (http://bimsurfer.org). BIMSurfer is an open source web-based viewer for the visualization of BIM models described as IFC models. It is based on WebGL (Web Graphics Library), a JavaScript API for rendering interactive 3D and 2D computer graphics within any compatible web browser without the use of plug-ins.

The sustainability analysis module 154 and social interactions module 152 will now be described in depth, before describing other additional functionality of the system 100.

First, the sustainability analysis module 154 will be described with reference to FIGS. 3 to 6.

There are a number of motives for building green, including environmental, economic, and social benefits. Modern sustainability initiatives call for an integrated and synergistic design approach that integrates the building life-cycle with each green practice. The goals of a green building are usually related to life-cycle assessment (LCA), structure design efficiency, energy efficiency, water efficiency, materials efficiency, indoor air quality, waste reduction. The essence of green building is an optimization of one or more of these principles.

An objective of the BIM system 100 is to allow users to examine energy performance of several design alternatives ahead of making decisions. This is particularly important in educating them ahead of making "green" choices. For this purpose the sustainability analysis module 154 is introduced. Most notably, the sustainability analysis module 154 executes a geometry simplification method 400, described in more detail below, for converting a BIM model to a model operable to be used by an energy analysis tool (e.g. Open Studio) in real-time, permitting comparison of sustainability analysis of design changes on the web interface of system 100 without having to go through redesigns. In the method, the geometrical information of an IFC file of a BIM model undergoes a translation process that flattens the solid-volume geometry for space bounding elements (such as walls, roof and floor slabs) into thin-walled thermal zone boundaries to link IFC models to sustainability analysis libraries. This provides the means of directly interacting with the building model, substituting building elements to test alternatives and perform energy analysis, all within an integrated environment.

Moreover, the sustainability analysis module enables the parametric analysis of the sustainability of alternative building designs. A quantitative approach is emphasized based on simulation results directly obtained from the processed BIM model. As such, alternatives for selected building components can be individually evaluated in context of the overall building design while maintaining that information is up-to-date and accurate.

Figure 3A:
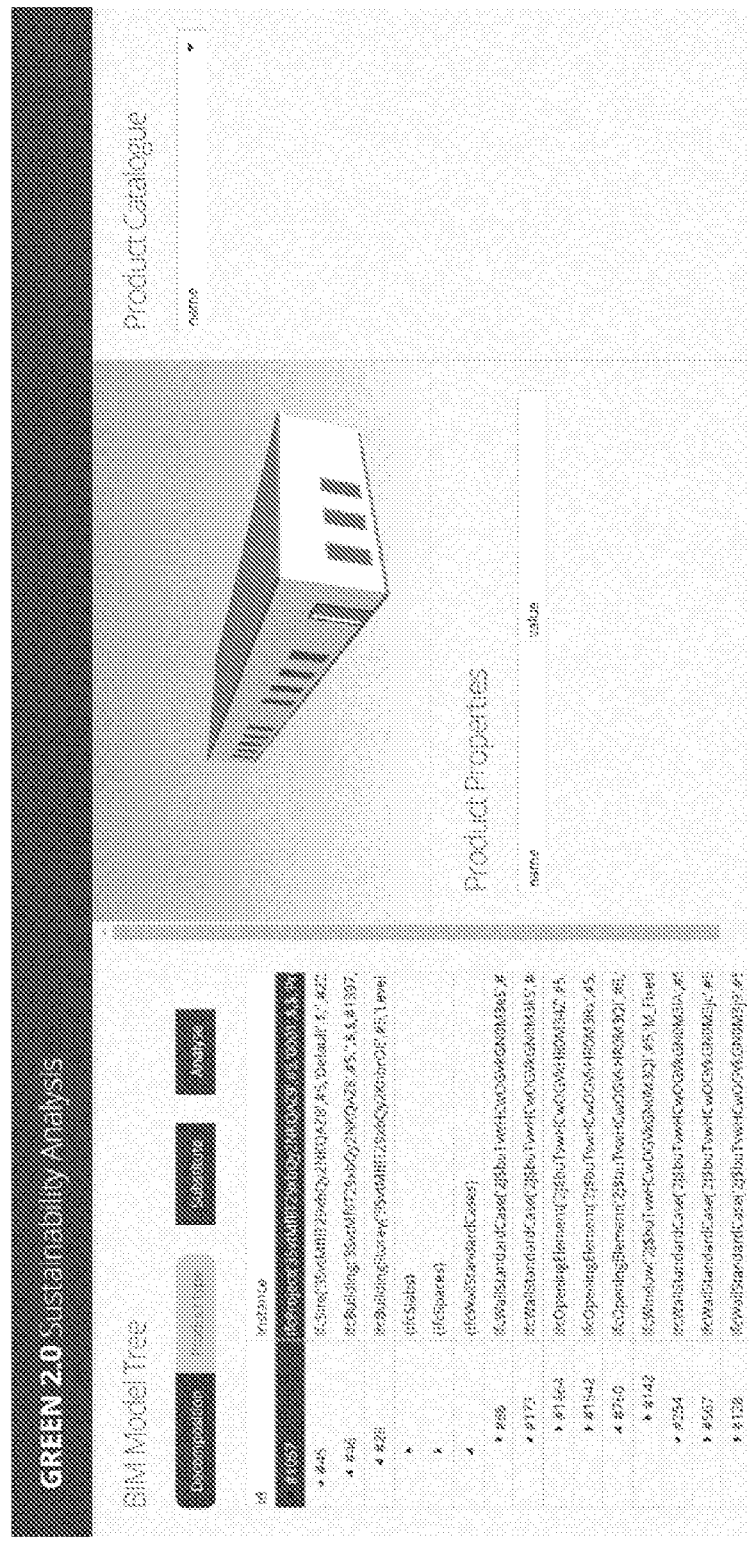
Figure 3B:
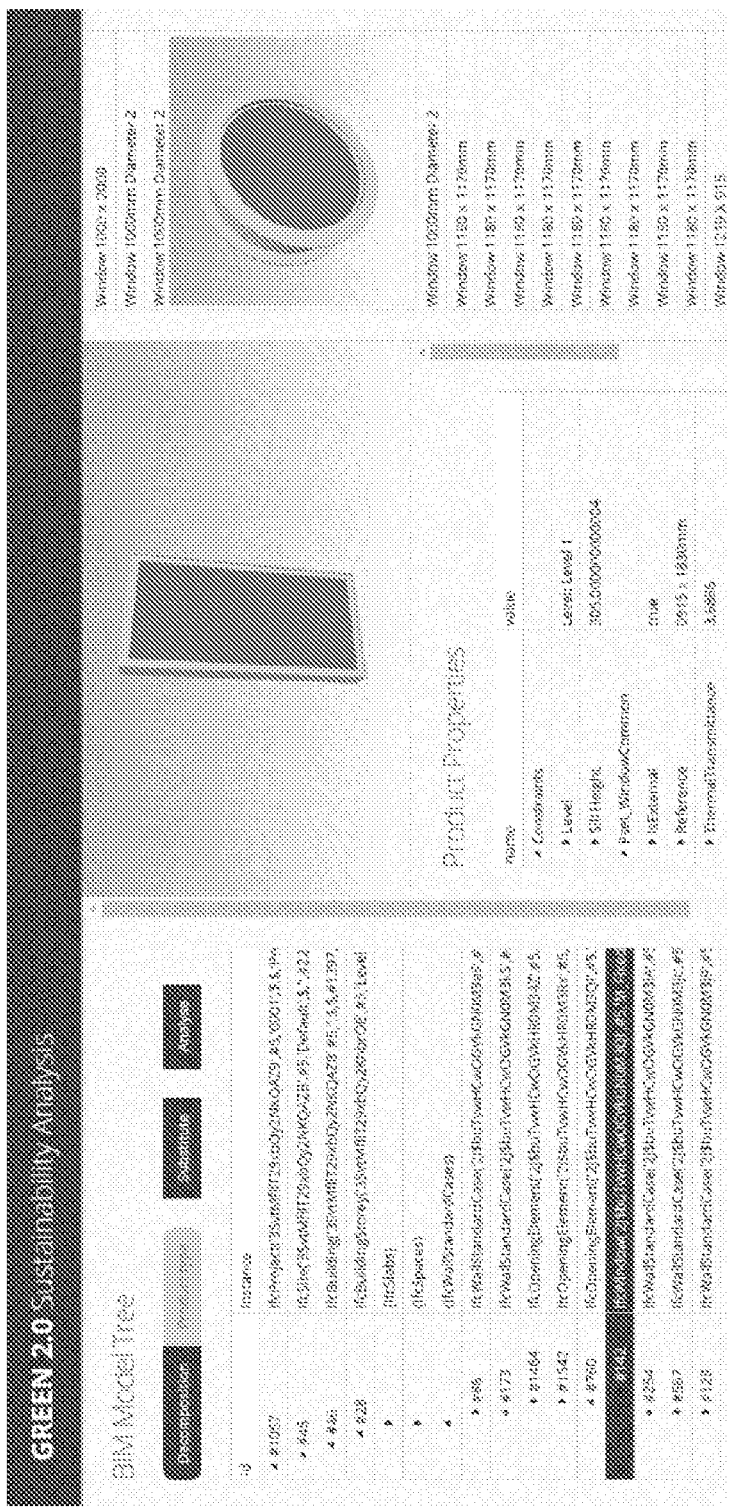
Figure 3C:
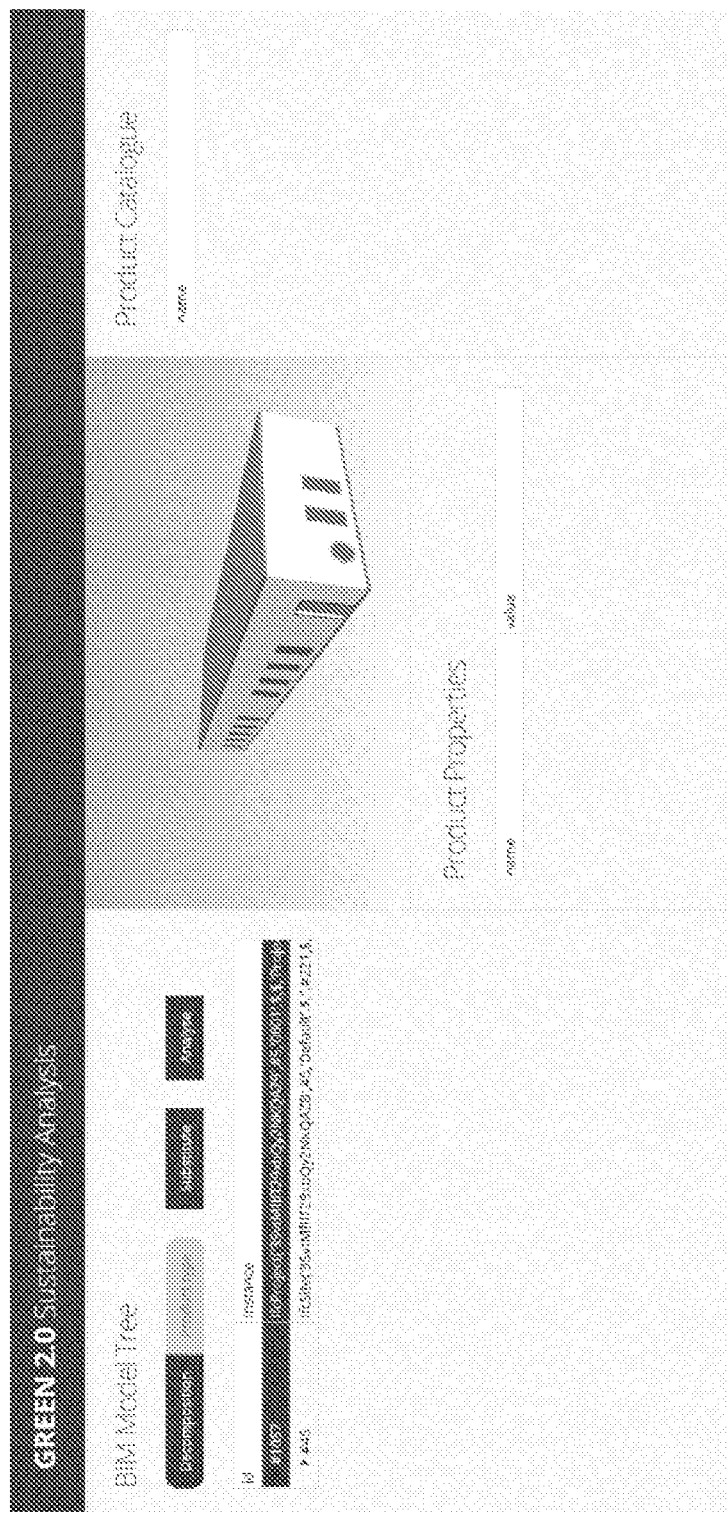
Figure 3D:
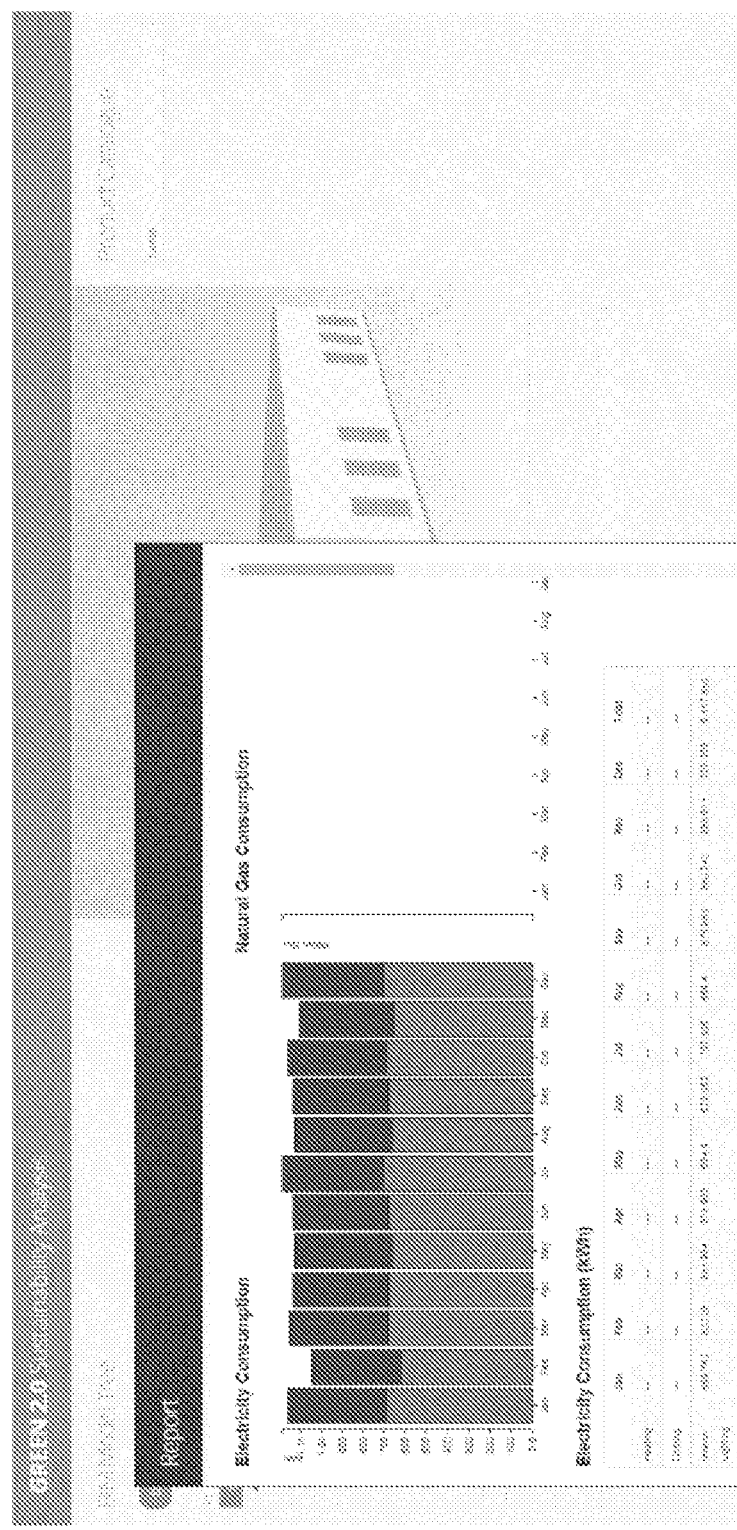

Before describing the geometry simplifcation method 400 in detail, some of the associated functionality will be described in relation to user interface screens shown in FIGS. 3A to 3D to provide context. As described more particularly in the following, FIG. 3A shows an original building model; FIG. 3B shows product listing and substitution; FIG. 3C shows a building model with a substituted element; FIG. 3D shows an example sustainability report of a model.

FIG. 3A shows that the module supports providing a detailed visualization of a building model as a decomposition of elements that affect its energy behavior. A BIM model is loaded and model elements are nested under their relating type in the model tree.

FIG. 3B shows that the module can generate a building element catalog. IFC is a relational data model in which building elements (subtypes of IfcProduct) are related to type information that groups common traits of building elements of the same class (subtypes of IfcTypeObject). As an example consider an IfcWall, which can be related to an IfcWallType. The product type tree, used for substitution, is built from subtypes of the IfcTypeObject in the IFC file. Upon synchronizing data with the main platform of system 100, the IFC files are scanned for such instances and recorded in the local database. This way the types in a model become available for substitution to all models in the database for evaluating alternative design choices. FIG. 3B shows that as a window element of the BIM model is selected; alternative products (i.e., windows) may be automatically listed, suitable for product substitution, Referring to FIGS. 3C and 3A, the two interface screens show building element substitution. An aim of the sustainability analysis module is to enable a comparative energy analysis of alternative building models. One key component of such a framework is to make assessments on the performance of an individual building element in relation to the complete building assembly. For example, an engineer might want to assess multiple window systems for the same building. In order to facilitate this, a building element substitution API is presented that allows a user to locally replace building elements, such as a window, with a comparable element (see FIG. 3A and FIG. 3C shows a transformation that occurs to the original model).

FIG. 3D shows a sustainability report which may be generated for each model that enables comparative sustainability analysis of alternative designs. In order to support sustainability analysis of alternative building designs by the system, building models need to be interpreted by software tools that support energy modeling; such analysis may be completed and the report generated at the conclusion of the method 400. The results of the analysis may be presented to the user by means of an HTML report.

For detailed thermal assessment of a building, a representation of its Heating Ventilation and Air Conditioning (HVAC) system is essential. However, the interpretation of this data in the IFC models is not currently in place. Yet, when it comes to reliably predicting building energy uses, the configuration and functioning of the HVAC system plays an important role.

When information flows between stakeholders in a construction project these different actors have distinct modeling paradigms. For successful communication one needs to transliterate into an idiomatic representation of information native to the receiver. For the needs of system 100, a main challenge is to map the information represented in an IFC file to information that can be represented in a format digestable by sustainable energy analysis software, such as an OpenStudio Model (OSM) file, as addressed by method 400. For the case of thermal analysis in particular, this means that the model needs to undergo some geometrical transformations. A crucial difference between IFC and sustainability anlysis formats (e.g. OSM) is that IFC files describe a building as a decomposition of individual components, which have one or more solid-volume geometrical representations and are enriched with semantic and relational information. An OSM file describes the building from the viewpoint of thermal zones and thin-walled space boundaries. The BIM model, describing the building as a decomposition of solid volumes, thus needs to be translated into a watertight assembly of thin-walled thermal zone boundaries. Therefore, not only does the information need to be encoded differently, the geometrical information needs to undergo a translation process that flattens the solid-volume geometry for space bounding elements (such as walls, roof and floor slabs) into thin-walled thermal zone boundaries. In addition, classifications of element types can be used to filter out irrelevant elements that do not affect the thermal behavior of the system.

The integration of energy analysis into the platform is thus critical for the sustainability anlaysis module, which permits a comparative energy analysis of building models by interfacing with a third-party energy analysis tool, such as OpenStudio (See at http://openstudio.nrel.gov). OpenStudio is a particular energy analysis program, comprising a cross-platform (Windows, Mac, and Linux) collection of software tools to support whole building energy modeling using EnergyPlus and advanced daylight analysis using Radiance. It is an open source project to facilitate community development, extension, and private sector adoption. Other software applications for energy analysis, such as DesignBuilder, eQuest, and IES try to present a state-of-the-art User Interface to users. However, these software applications are commercial (proprietary). As a result, users are constrained by the provided UI to make limited analyses. In contrast, OpenStudio is open-source, cross-platform and cross-language. In addition, OpenStudio provides a rapid development mode and open application programming interface (API), which makes it highly extensible and customizable. All of these aspects suggest OpenStudio as a suitable platform for supporting the data exchange needs of building energy modeling in system 100, though others are possible.

Notably, though various embodiments provided herein specifically describe methods for transliterating an IFC model to an OpenStudio-compatible model so that energy efficiency analysis is possible, the described methods could function with other energy analysis models, with slight modifications in order to adapt the model's specification.

Some further concepts for understanding the applicability and motivation for the method 400 are now briefly described. The geometry in IFC has traditionally been known to be lower order tessellated geometries, where semantically richer and more precise models could have been more appropriate. The abstract IfcRepresentation entity is the base for the majority of the typical three-dimensional view on a BIM model. Relational meta-data can also be annotated with geometrical elements. In the context of thermal simulation, most notably, this is reflected in the concept of spaces boundaries IfcRelSpaceBoundary, which relate spaces to their bounding elements by means of a surface where the two elements touch. Similarly, IfcRelConnectsPathElements can be used to model how wall elements connect into closed loops. However, space boundaries in general can be missing or inaccurately defined. IfcRepresentationitem has 124 subtypes in the IFC2x3 schema. This creates a wide variety of constructs that can be used to model geometry in IFC. On top of that, geometry contained in representation items can be altered by relations on a product level. In particular, and very commonly, IfcOpeningElements are used to model cavities in walls and slabs, which subsequently are filled by other building elements, such an IfcWindow. A boundary representation (BRep) is a data structure for representing solid volumes by describing its oriented bounding surfaces. It describes the topology (or connectivity) into types such as: vertices, edges, wires, faces, shells, or solids and associates the geometry (typically in Cartesian space), such as points, curves and surfaces. Solid volumes with the same topological characterization can have different geometric forms. For example moving the underlying points of the vertices only affects the geometry. In contrast, edge curves or face surface can be altered without affecting the topology. Topological elements from a hierarchy, and hence, a BRep is in fact a tree structure, in the sense that a solid encapsulates one or more shells, which in turn encapsulate one or more faces, and so on. The elements that are not paired with a geometrical elements, aggregate one or more lower level topological entities.

Figure 4:
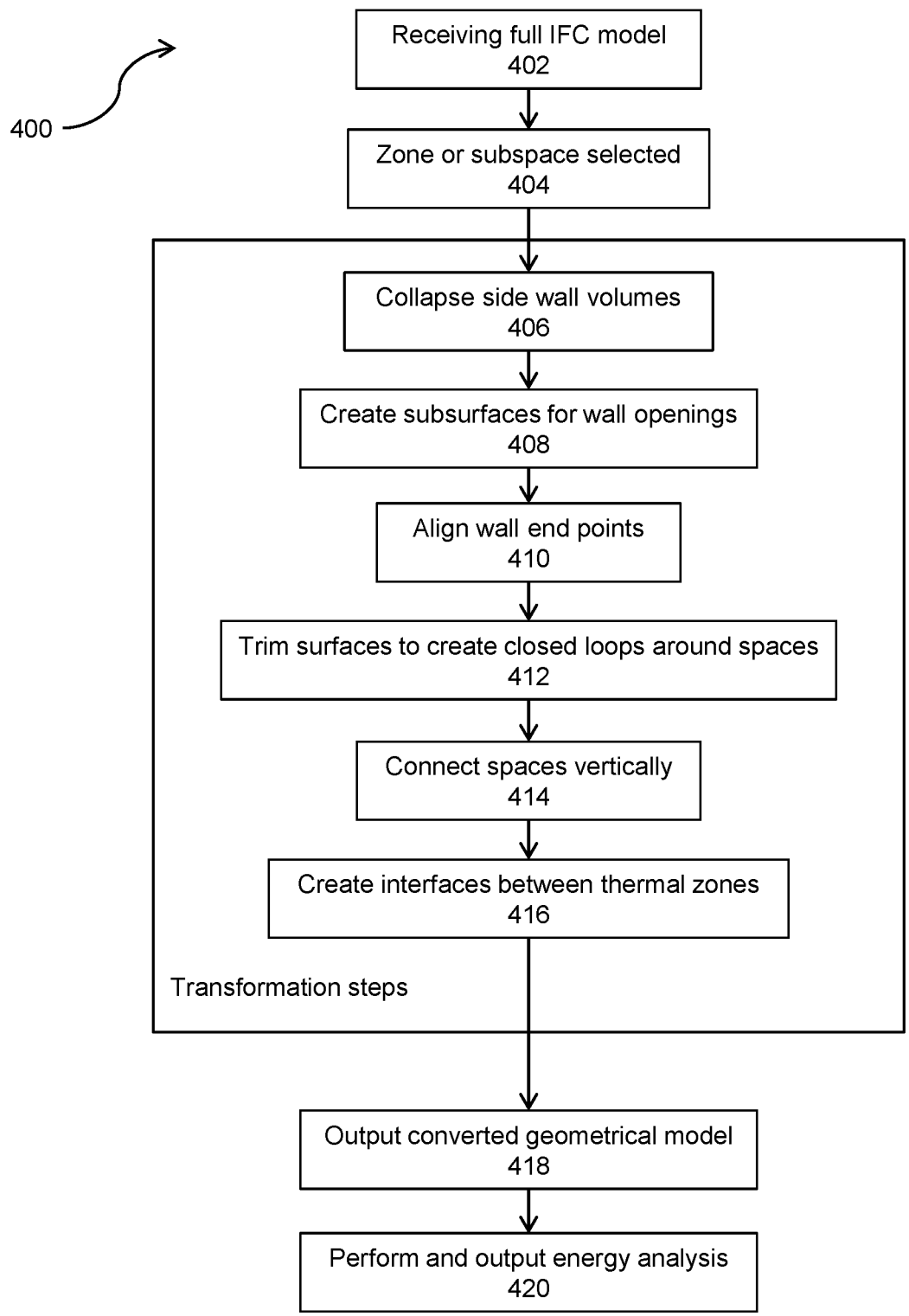
FIG. 4 illustrates steps of a method of geometric simplification carried out by a sustainability analysis module.
Figure 5A:
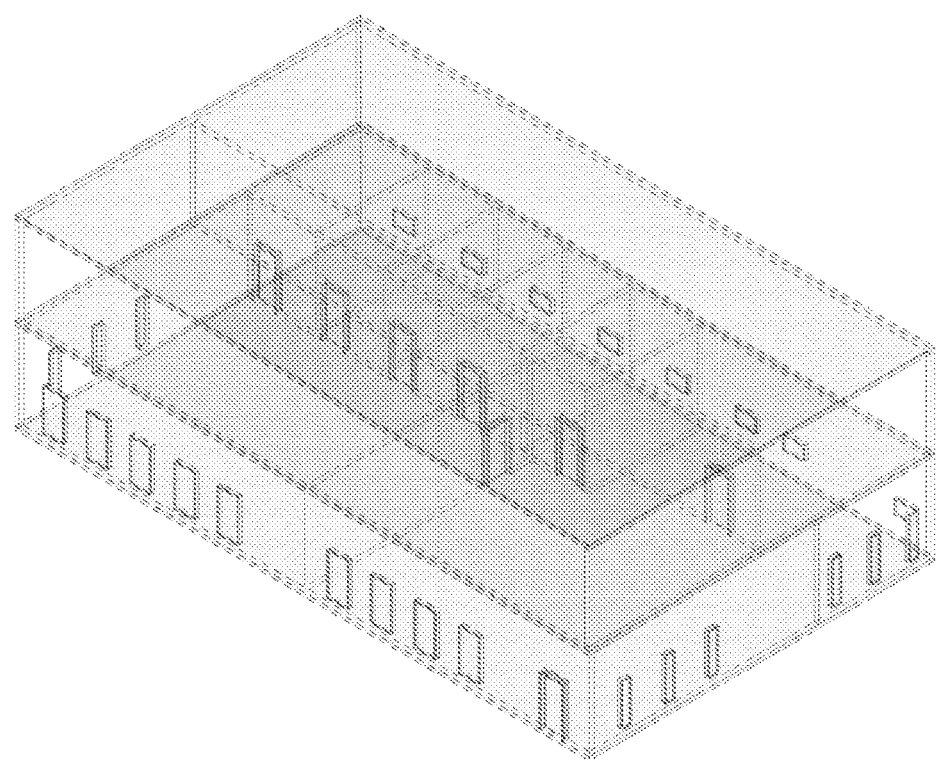
Figure 5B:
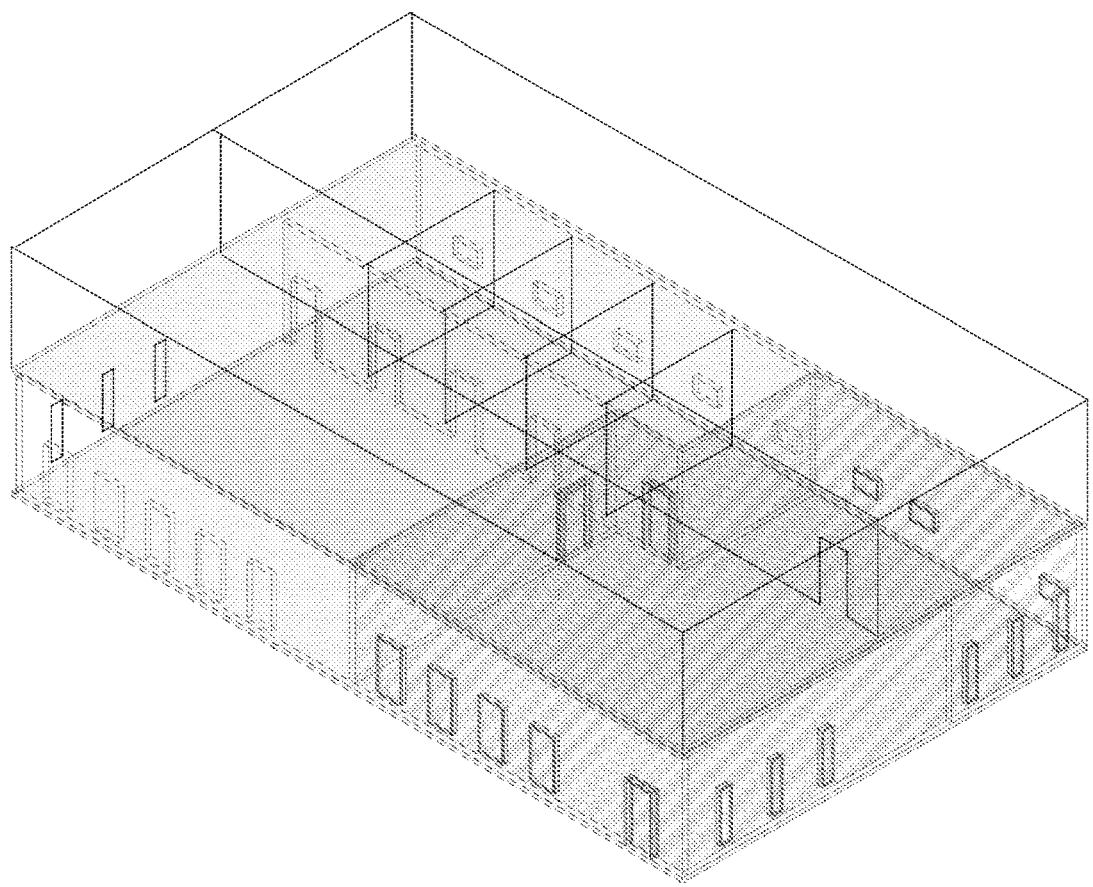
Figure 5C:
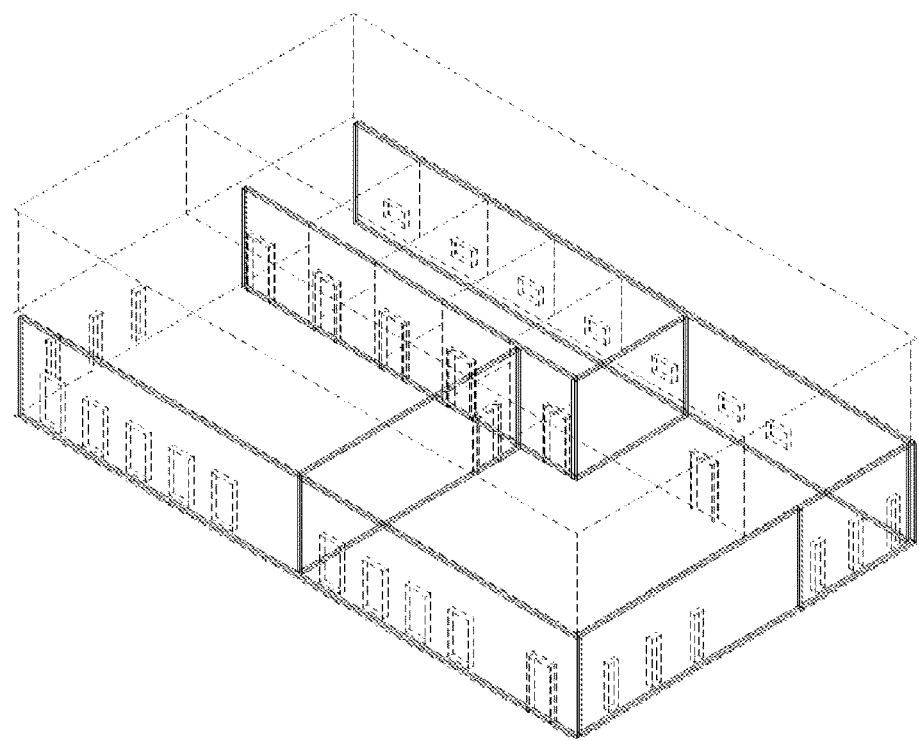
Figure 5D:
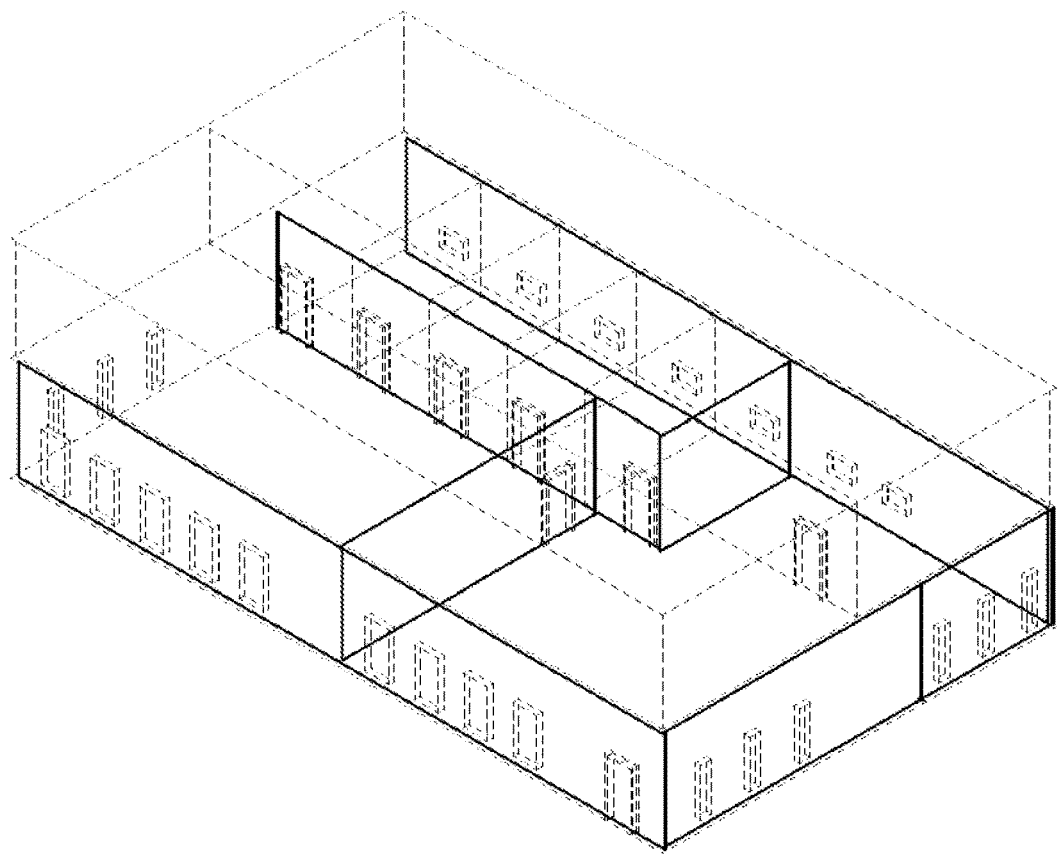
Figure 5E:
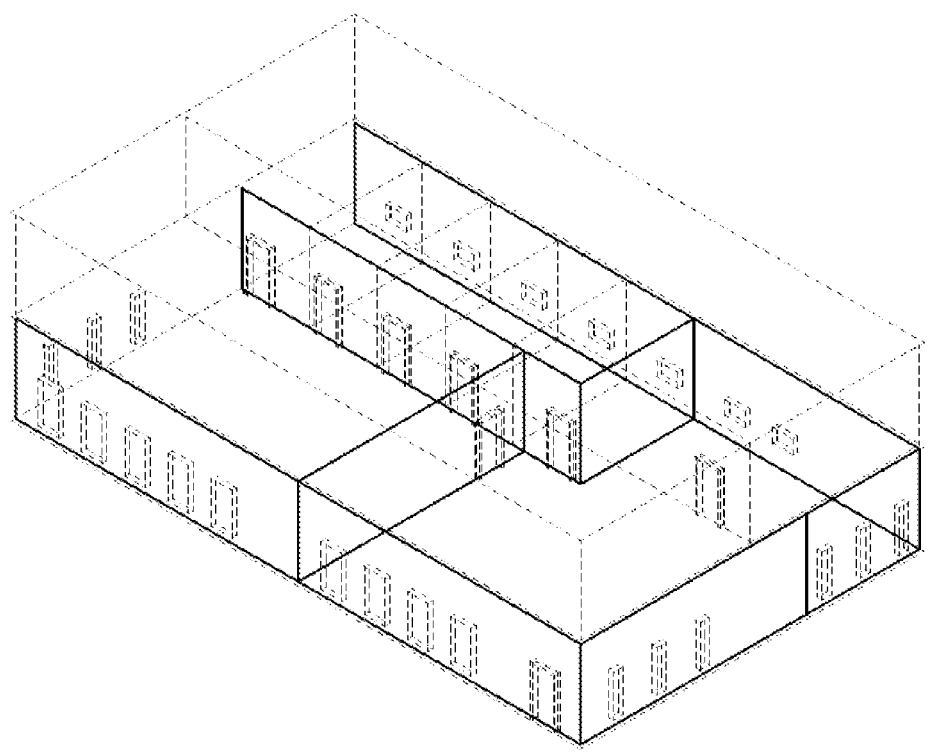
Figure 5F:
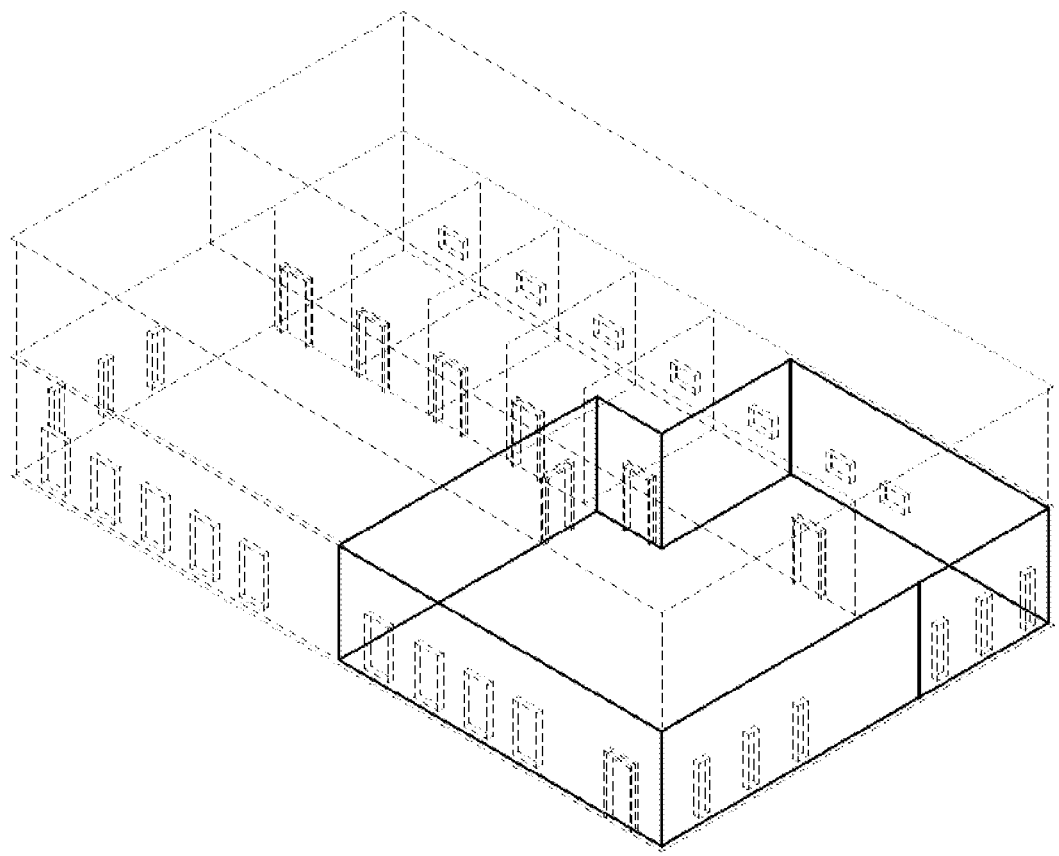
Figure 5G:
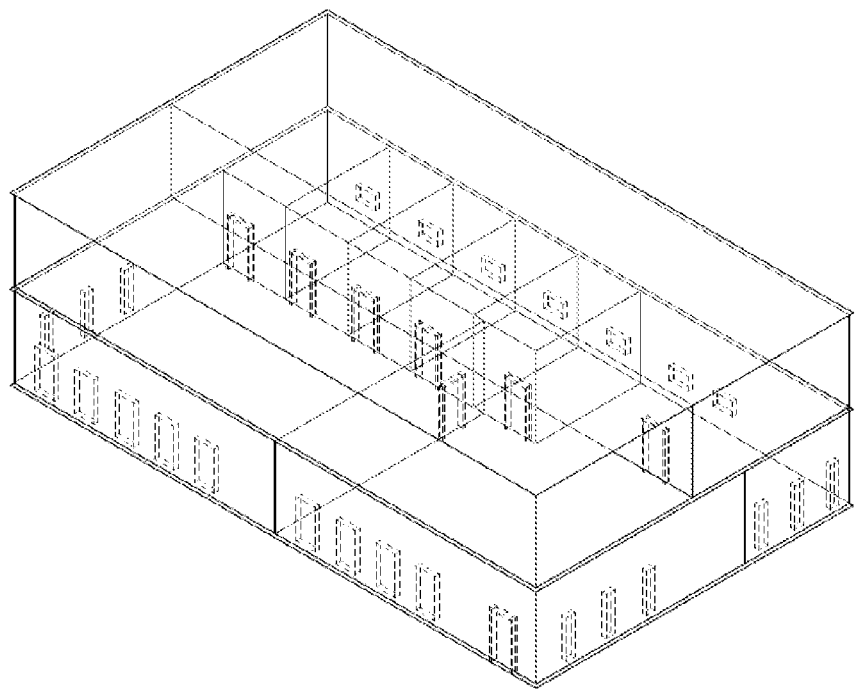
Figure 5H:
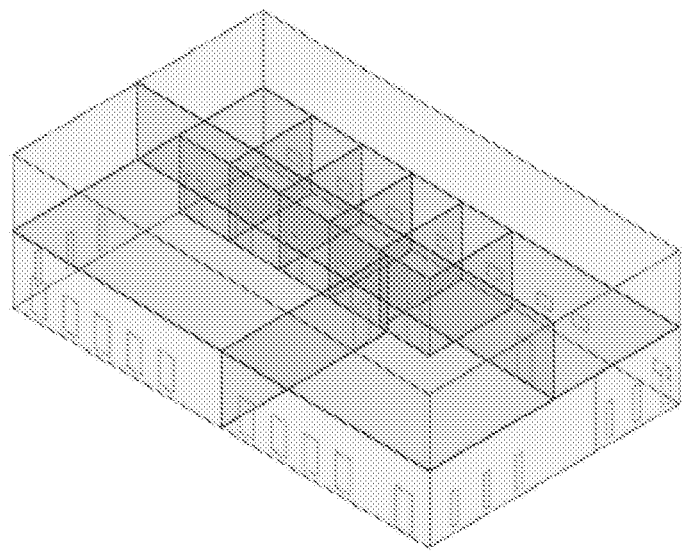

Referring to FIGS. 4, 5A to 5H, where FIG. 4 illustrates the steps of the geometric simplification method 400, and FIGS. 5A to 5H show a sample schematic illustration of the transformations being conducted. In general, the method 400 starts by receiving a full IFC model (See FIG. 5A) at block 402. A zone or subset space for analysis is then selected at block 404 (See FIG. 5B). Six transformation steps can then carried out at blocks 406 to 416, as will be described below, to reach the final thermal zone representation shown in FIG. 5H. In brief, FIG. 5C shows bounding walls; FIG. 5D shows centered faces (as solid wall volumes are collapsed); FIG. 5E shows adjusted faces; FIG. 5F shows trimmed faces; FIG. 5G shows all spaces; and FIG. 5H shows the final thermal zone results. Subsequently, energy analysis may be performed (illustrated by block 418) on the thermal zone representation by a suitable energy analysis library, with the results optionally output and displayed as a report (shown by block 420).

As has been mentioned, the geometry simplification module presented in method 400 transliterates from an architectural or structural modeling paradigm into an idiomatic thermal analysis model. From literature and experiences it appears that space boundary geometry can be unreliable, therefore the module operates to a large extent only on the explicitly visible information, the representations of the building elements. This ensures no operations incur based on data that is invisible to end-users. IFC Representation of building elements are converted into generic Boundary Representations, for the purpose of having a generic view on the geometry, agnostic of what exact geometrical entities (e.g extrusions or explicit meshes) define the shape of the elements. For example, in the case of wall elements, two key representations are targeted: their Body and their Axis. The former is converted into a Solid or Shell, the latter is interpreted as a Wire.

The six transformation techniques occurring at blocks 406 to 418 will now be described.

Referring first to block 406 and FIG. 5D, the illustrated transformation step comprises collapsing solid wall volumes. Technique 1 shown below provides an illustrative implementation of this step. Technique 1 defines a surface ($\mathcal{C}_{\mathcal{A}_w}$) parallel to the longitudinal direction of the wall (w) that can replace the solid geometry of the wall in a watertight surface model of thermal zones. Vertices from the footprint of the wall are projected onto the parametric space of the Axis curve. The difference vector to the projection of these vertices is stored in the set created at Line 10. For walls with uniform thickness, these will fall into two bins, modulo modeling precision, that represent the distances of the two vertical faces in the longitudinal direction of wall w to $\mathcal{C}_{\mathcal{A}_w}$.

Averaging these two distances yields to necessary amount by which $\mathcal{C}_{\mathcal{A}_w}$ needs to be offset in order to produce the center face. Note that this procedure is necessary as $\mathcal{C}_{\mathcal{A}_w}$ is not necessarily in the middle of the wall, this depends on the IfcMaterialLayerSetUsage associated to the wall.

Technique 1

```
1:  function COLLAPSE (w)
2:      for all rep in w.Representation.Representations do
3:          if rep.RepresentationIdentifier = "Axis" then
4:              𝓐_w ← BR_EP(rep)                              ▷ Create Boundary Representation
5:          else if rep.RepresentationIdentifier = "Body" then
6:              𝓑_w ← BR_EP(rep)
7:      assert EDGES (𝓐_w) ≠ ∅
8:      assert FACES (𝓑_w) ≠ ∅
9:      𝓒_𝓐_w ← CURVE(e) | e ∈ EDGES(𝓐_w)                   ▷ Random edge from set,
                                                                wall assumed continuous
10:     d ← ∅
11:     u ← (∞, -∞)
12:     for all 𝓕_𝓑_w in FACES( 𝓑_w ) do
13:         if SURFACE(𝓕_𝓑_w) ∥ 𝓟_XY then                   ▷ Parallel with XY plane
14:             if SURFACE(𝓕_𝓑_w) ∩ 𝓒_𝓐_w ≠ ∅ then         ▷ Intersects with axis curve
15:                 for all 𝓥_𝓕_w in VERTICES(𝓕_𝓑_w) do
16:                     𝓟_0 ← POINT (𝓥_𝓕_w)
17:                     u_0 ← PROJECT(𝓟_0 → 𝓒_𝓐_w)          ▷ Project point onto
                                                                axis curve, returns
                                                                curve parameter
18:                 u ← (min(u(0), u_0), max(u(1), u_0))
19:                 𝓟_1 ← 𝓒_𝓐_w(u_0)                        ▷ Evaluate curve at u_0
20:                 𝓋 ← 𝓟_1 - 𝓟_0                           ▷ Find difference vector
21:                 d = d ∪ 𝓋                               ▷ Add to set
22:     assert |d| = 2                                       ▷ Modulo modeling precision
23:     return EXTRUDE(TRIM(OFFSET(𝓒_𝓐_w → avg(d)), u))
```

Figure 6A:
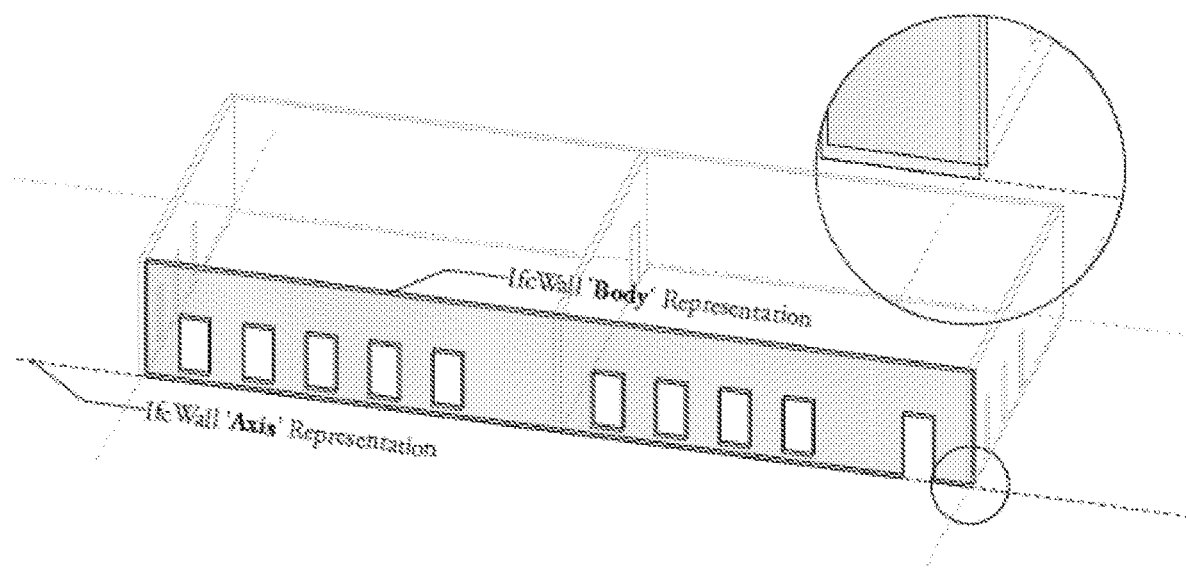
FIGS. 6A and 6B further illustrate the step of trimming faces of the method for geometry simplification.
Figure 6B:
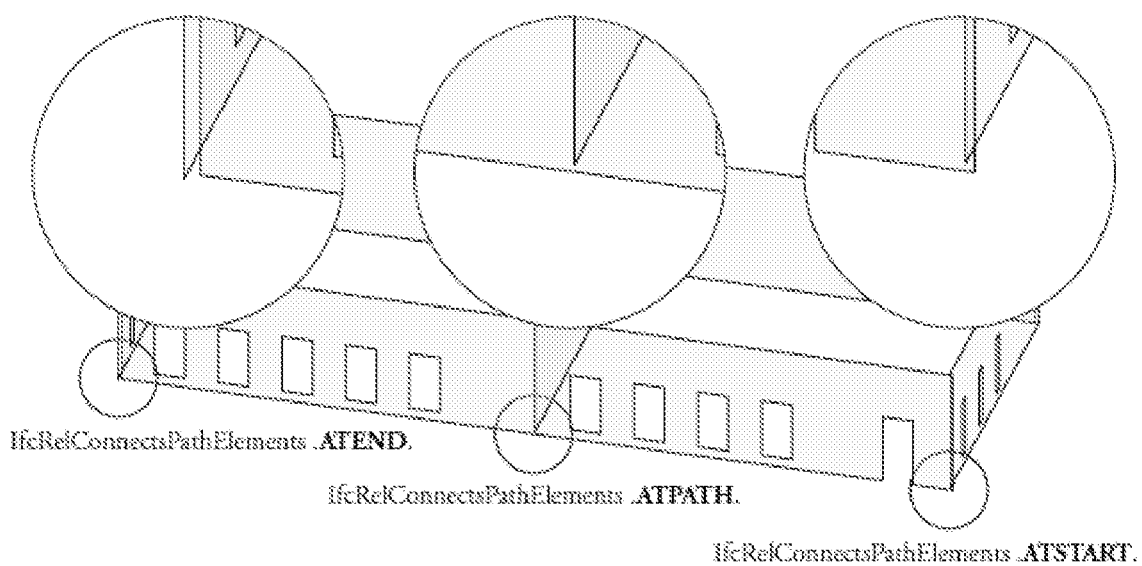

Block 408 comprises creating subsurfaces for wall openings. Window and door geometries tend to be defined in great detail in IFC files, typically using detailed faceted geometry. Yet, from a thermal analysis point of view, a single surface, defined as a subsurface on the wall surface that harbors these elements is sufficient. Hence, the wall center surfaces, that are the result of the previous block 406 are intersected with the opening element volumes to come to a simplified, yet accurate, subsurface for these elements. Since this is a boolean operation, no algorithmic description of this step is provided. The subsurfaces are shown in FIG. 5H.

not align at the corners where two walls meet. In some cases this leaves a gap between them. In Other cases, this means that one surface extends beyond the other. Yet, for the thermal simulation, it is imperative that the thermal zone volume is water-tight. Hence, for every permutation of connected wall elements, the center face surfaces are intersected and trimmed or extended based on the found intersection curve. See also FIG. 6, which shows aligning wall end-points after collapsing solid volumes. FIG. 6A shows 'Axis' and 'body' representations of wall elements. FIG. 6B shows topological connection annotations in the IFC model.

Technique 2

```
1:  procedure MERGE_ENDS(w_0)
2:      𝓕_w,0 ← COLLAPSE(w_0)                                ▷ Center face function from Alg. 1
3:      for all rel in w.ConnectedTo do
4:          if rel ε IfcRelConnectsPathElements then
5:              rt ← rel.RelatingConnectionType
6:              if rt ε [ATSTART,ATEND] then                 ▷ If .ATPATH. only
7:                  if rel.RelatedElement ε IfcWallStandardCase then    the releated wall end
8:                      𝓕_w,1 ← COLLAPSE(rel.RelatedElement)              needs to move
9:                      𝓒_w,1,2 = SURFACE(𝓕_w,0) ∩ SURFACE(𝓕_w,1)
10:                     d_min ← ∞
11:                     ε_c ← ∅
12:                     for all e in EDGES(𝓕_w,0) do
13:                         d ← DISTANCE(CURVE(e), 𝓒_w,1,2)
14:                         if CURVE(e) ∥ 𝓒_w,1,2 and d < d_min then
15:                             ε_c ← e                                 ▷ The edge closest to the
16:                             d_min ← d                                 intersection will be moved
17:                     𝓥 ← ∅
18:                     for all e in EDGES(𝓕_w,0) do
19:                         if e ≠ ε_c then
20:                             𝓥_e,c ← VERTICES(e) ∩ VERTICES(ε_c)
21:                             if 𝓥_e,c ≠ ∅ then
22:                                 p ← CURVE(e) ∩ CURVE(ε_c)
23:                                 VERTICES(e) ← VERTICES(e)\[𝓥_e,c → p]
24:                     EDGES(𝓕_w,0) ← EDGES(𝓕_w,0)\[ε_c → 𝓒_w,1,2]
```

Block 410, referring to FIG. 5E and Technique 2, comprises aligning wall-end points. Because thick wall volumes have been transfered into a single surface, these surfaces do Block 412, referring to FIG. 5F, comprises trimming surfaces to create closed loops around spaces. Walls can extend beyond the boundary of a single space and run alongside several spaces, as can be seen in FIG. 5C. In order to proceed from FIG. 5E to FIG. 5F halfspace solids are constructed from the wall center faces in FIG. 5E and used to trim connected walls. A halfspace solid is a solid that divides the Cartesian space $\mathbb{R}^3$ into two sets, either on the one side, or the other side of the bounding surface. This operation only needs to be applied to "ATPATH" wall connections.

Block 414 comprises connecting spaces vertically. Similarly to how walls have been collapsed to a single face, slabs that bound the spaces are flattened to a single center face, based on their orientation. The wall center faces are extended to these faces. And for the spaces, bottom and top faces are created on these slab center faces, bounded by the projections of the wall boundaries. Geometrically, this is similar to the horizontal alignment of wall end-points, hence, an algorithmic overview is omitted for brevity, but is similar that described in relation to block 410 with necessary modifications. The result of the procedure can be seen in the transition from FIG. 5G to FIG. 5H.

Block 416 comprises creating interfaces between thermal zones. The result from the block 414 is a single water tight volume for every space, that aligns geometrically with all neighboring spaces. However, similar to the concept of second order space boundaries, interfaces need to be created that map exactly from one thermal zone to another. For example, in case walls that extend beyond multiple spaces, one thermal zone boundary would map to several other zones. Hence, for all 2-combinations of spaces $\{\{S_0, S_1\} | S_0 \neq S_1;\ S_0 \in \text{IfcSpace};\ S_1 \in \text{IfcSpace};\ \}$ if there is a building element B with $B \in \text{IfcSlab} \cup \text{IfcWall}$ that connects $S_0$ and $S_1$, the faces resulting from Block 412. $\mathcal{F}_{S_0,B}$ and $\mathcal{F}_{S_1,B}$ need to be intersected such that there is one face exclusively interfacing $S_0$ and $S_1$. Since these faces share the same underlying surface, the boolean intersection can be performed in the two-dimensional parametric coordinate space of the surface. This step yields the completely converted geometrical model in FIG. 5H.

With the converted geometrical model being completed, it can be output at block 418 for energy analysis.

Requirements and limitations of the method 400 will now be described. The method operates on the following constructs that need to be present in order for conversion to be successful. Workarounds are also given in for some deficiencies, in case they are determined to be feasible for the particular situation.

First, there must be "Body" and "Axis" representation for walls. Without "Axis" representations, the opposing longitudinal faces cannot be identified and the solid wall volume cannot be collapsed into a single face. In this case the algorithm will terminate. Alternative ways of identify the longitudinal faces can be implemented, for example by judging surface area or the width of the IfcMaterialLayerSet.

Further, there must be geometric continuity of walls. Discontinuities in the wall axis will result in more than two projection vectors in Algorithim #1, Line 22. In this case the method will terminate. Note that according to Liebich, T., 2009, Ifc 2× edition 3: Model implementation guide. version 2.0 retrieved from http://www.buildingsmart-tech.org/downloads/accompanying-documents/guidelines, 2-2.22 (Liebich, T., 2009), the IfcWallStandardCase concept dictates the same requirements. A possible solution to this include subdividing walls by the algorithm at discontinuities.

Further, walls must have uniform thickness. A non-uniform thickness will yield different projection distances for the reduced surfaces. In this case the algorithm will terminate. Further, non-uniform thickness implies that the thermal conductivity of the wall will not be uniform either. The changing thickness can be approximated by subdividing the wall at regular intervals.

Further, with regards to semantic relations to opening elements, the practice should as be as described in Liebich, T., 2009.

Further, there must be connectivity information for elements to spaces. Without this, a thermal-zone centric view cannot be obtained. Several contemporary IFC exporters have the option to turn this on or off.

Further, there must be topological connectivity information, in the illustrated implementation using IfcRelConnectPathsElements. The method will not terminate, but will fail to create water tight volumes, as Technique 2 depends on this information. As an alternative, it is possible to compute topological adjacency based on geometrical proximity.

Further, there must be correct classification of walls and slabs. Elements are selected for processing in relevant steps based on their IFC entity types. Sometimes these can be incorrectly classified; this case will cause method 400 to not function correctly.

Finally, with respect to convex space volumes, as far as the bounding loop of adjacent walls is concerned, a space can have concavities in its footprint. However, a concave elevation will yield incorrect vertical alignments.

The social interactions module 152 will now be described with reference to FIGS. 7A to 7D.

An objective of the system 100 is the efficient management of the various interactions that occur between BIM elements and people. In principle, the system provides means of online communication and collaboration of the various actors (engineers, owners, contractors, end-users, etc.) around building design elements. But, it also provides the means of structural and textual analysis of the underlying collaboration networks and discussions. The implementation details about the modules of facilitating the management of these complex interactions will now be discussed.

As set out above, the social interactions module comprises a BIM communication module and BIM social network analytics module.

The BIM communication module enables online communication and collaboration through shared BIM models. In order to share a BIM online, it first needs to be uploaded by its owner in the system, typically as an IFC file. Then, the owner can share it by sending email invitations to known actors or by browsing the user database seeking for experts to join the project. Once users have access to a shared BIM model, they can use the 3D building model visualization tool to navigate, explore, and select specific elements of the model (see FIG. 9 described below). Once an element is selected, the various element properties are listed that provide useful information to the expert. The collaboration is facilitated by means of a rich comment management tool that allows users to submit, edit, delete, and filter comments about selected BIM elements. The functionality is similar to that found in an online discussion forum, with the exception that the discussion is domain-specific and thus domain-specific features may be supported. To facilitate interoperability and support the openness of the platform, comments can be modeled to adhere to the BIM Collaboration Format bcfXML-v1 (See http://www.buildingsmart-tech.org/specifications/bcf-releases/bcfxml-v1), an open standard that supports workflow communication in BIM processes. According to the standard, comment types are one of info, error, warning or unknown (see FIG. 7A). A user can navigate comments in chronological order or other semantic properties. Notifications are also available that inform actors for new dialogues or updated conversations.

Figure 7A:
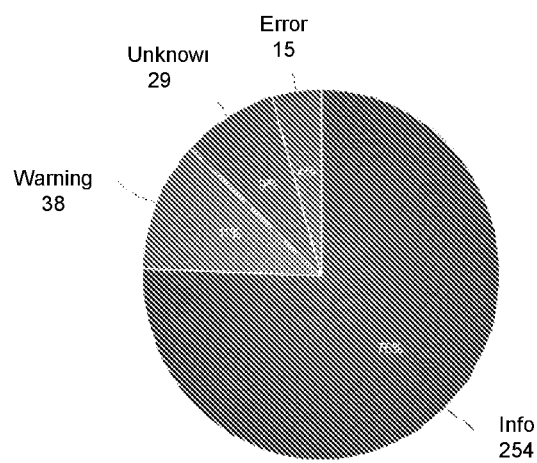
Figure 7B:
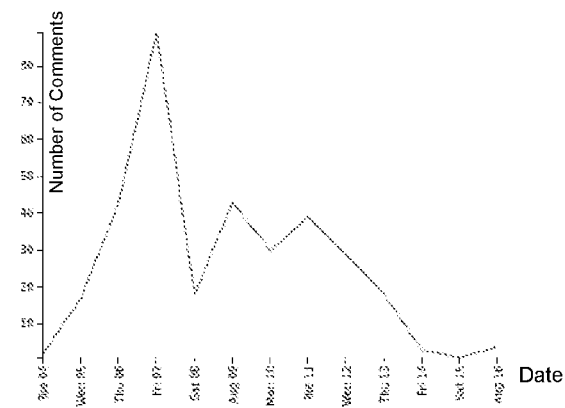

With regards to the BIM Social Network Analytics Module, as various actors interact with BIMs online, large amounts of data become available to the system. This module is responsible for the collection, storage, analysis and visualization of such data in a meaningful way, enabling reporting real-time aggregate information about BIM project activity. FIG. 7A and FIG. 7B show aggregate analytics about an example BIM project. Particularly, FIG. 7A shows the distribution of project comments by type according to the bcfXML-v1 open standard. FIG. 7B shows the distribution of project comments over time.

Social interactions that occur among the various actors (engineers, owners, contractors, etc.) during collaboration processes consist valuable information for analysis. Revealing interesting patterns of this communication can further enrich user experience and support decision making. The approach followed by the BIM Social Network Analytics Module is to define discussion networks based on interactions of actors and building elements and perform analysis on the underlying networks. These networks can be defined at many different levels of granularity. Aiming for a platform as flexible and open as possible, the networks can be defined at three different levels of operation: Element-level Networks (EN), Project-level Networks (PN), Cross-project-level Networks (CN)

For each of the operational level above, a graph G(V, E) may be defined comprising of a set of vertices V and a set of edges E. In the case of EN, each node represents a user and each edge represents that two users have contributed in a discussion thread about a specific building element. Accordingly, in the case of PN, each node represents a user and each edge represents that two users have contributed in discussion threads of at least one common building element of a BIM project. Finally, in the case of CN, each node represents a user, and each edge represents that two users have contributed in at least one discussion thread of a shared project. It is easy to see that a user always represents a node in the network, while the type of interaction between two users defines the exact semantics of an edge in that network. For the various definitions of a network (EN, PN, CN), a number of network insights are possible, based on network analysis. For each network, the BIM Social Network Analytics Module can report a number of important network structure measures, such as network size, diameter, density and characteristic path length. Note that due to the system's architecture, it is more network measures can be plugged in to meet the needs of the various actors of the AEC domain.

Figure 7C:
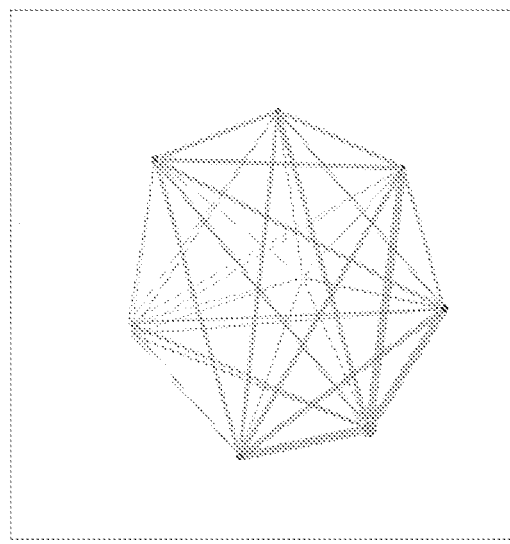
Figure 7D:
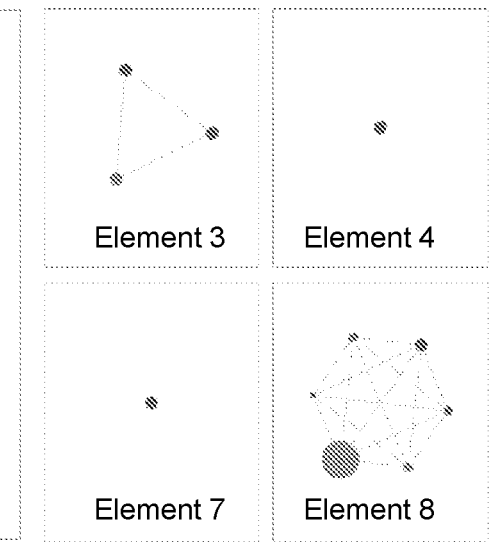

As mentioned earlier, the BIM Social Network Analytics Module is also responsible for the visualization of the various networks. FIG. 7C shows an example project level network (PN), while FIG. 7D illustrates a number of element-level networks (EN) networks about various elements of a specific project. As shown, a user can select to depict trending discussions visually. For example, the element-network (EN) representing BIM "Element 8" in FIG. 7D is shown to be trending because there is a lot of discussion going on around it, as depicted by the large size of the network. A user can navigate there directly by means of selecting (clicking on in the user interface) the network. There are a number of ways to make the network visualizations more informative. Nodes can be labeled with user-specific information, such as the role that a user is assuming in the discussion; edges can be labeled with properties, such as the time of interaction or the frequency of interactions over a time period. Essentially, the BIM Social Network Analytics Module informs about the network structure and BIM-related semantics of network nodes and edges, then analysis can be performed in a number of meaningful ways.

The BIM Social Network Analytics module may be enabled due to integration with network analysis libraries, for example third-party network analysis libraries. In particular, the NetworkX software package is used for the creation, manipulation, and study of the structure, dynamics, and functions of complex networks. The system 100 can export instances of a network based on the various definitions of a network (EN, PN, CN) and provide them as input to the library. The library can perform optimized computations and computes the graph metrics, which are then communicated back to the system and stored locally in the database. For network visualization purposes the D3.js JavaScript library can be employed.

With the core infrastructure of the system 100, sustainability analysis module and social interactions module described in the foregoing, high level system functionality (particularly from the perspective of the user through an illustrative user interface) and additional possible modules will be described in the following paragraphs.

The system 100 described above advances multi-disciplinary collaboration, socio-technical analysis, comprehensive simulation and stakeholder participation in an integrated and comprehensive web-based environment towards the goal of sustainable building design.

Central to the functionality of the system is the notion of a BIM project that a project actor (user) can operate on. The system may distinguish between two types of BIM projects—owned and shared. A user can either be the owner of a BIM project or can be an invitee—invited by an owner to join a project. The two types of users may define different authorization policies and control access to resources. Actors participating in projects are assigned roles (e.g., architect, engineer, etc.). There are two ways of assigning roles to actors in the system. One way is to assign one of the popular AEC industry roles, coming from an AEC domain ontology. To add flexibility and accomodate ad hoc roles of participation in a project, the system may allow owners of the project to assign user-defined roles, in the form of free textual tags, a practice commonly seen in Web2.0 services.

Figure 8:
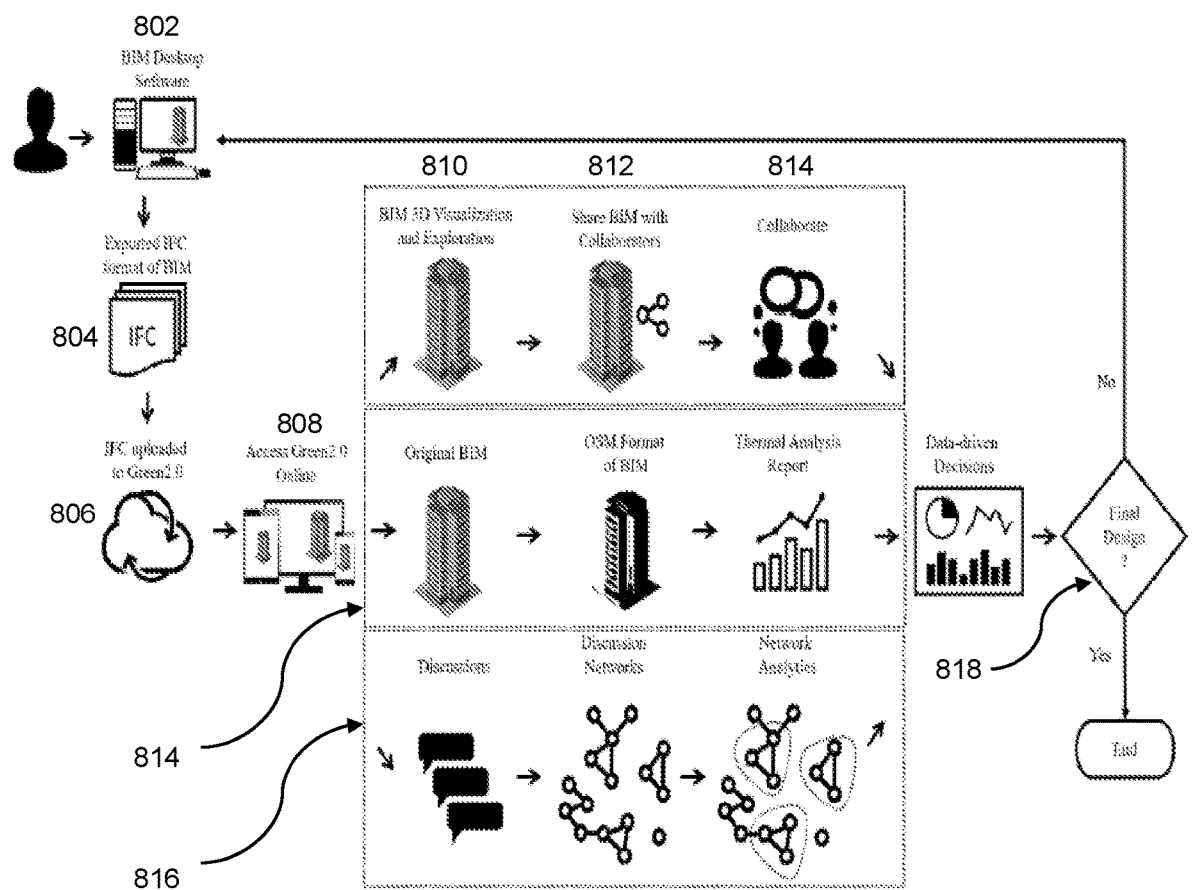
FIG. 8 illustrates collaboration, thermal analysis and network analysis workflows in the system.

As an owner, a user may have unrestricted access to the projects she owns. The main functionality of the system is described below and a flowchart is provided in FIG. 8. FIG. 8 depicts the collaboration, thermal analysis and network analysis workflows in the system. More particularly FIG. 8 depicts, accessing BIM software (Block 802), Exporting an IFC format of a BIM (Block 804), uploading the IFC to the system 100 (Block 806). The user can then access the system 100 through a web portal (Block 808) to access functionality, including to visualize and explore the BIM (Block 810), share the BIM (Block 812), collaborate with others relating the BIM (Block 814). The user can further convert the BIM for energly analysis and reporting utilizing the sustainability analysis module (Block 816). The user can engage in or analyze discussion and networks using the social interactions module (Block 818). This functionality permits data driven decision making.

As an invitee, a user may have limited access to the projects owned by other users including viewing, exploring and interacting with a shared BIM, participating in a discussion and monitoring the social activity around a shared project.

With respect to functionality for creating/editing/deleting BIM projects, the IFC format of the BIM project needs to be uploaded to the service from a computing device. Most popular BIM software (e.g., Bentley AECOsim Building Designer, ArchiCAD, Tekla Structures, Autodesk Revit, Synchro PRO, VectorWorks) provides an interface to export a BIM model to an IFC file (typically having file extension ".ifc").

Figure 9:
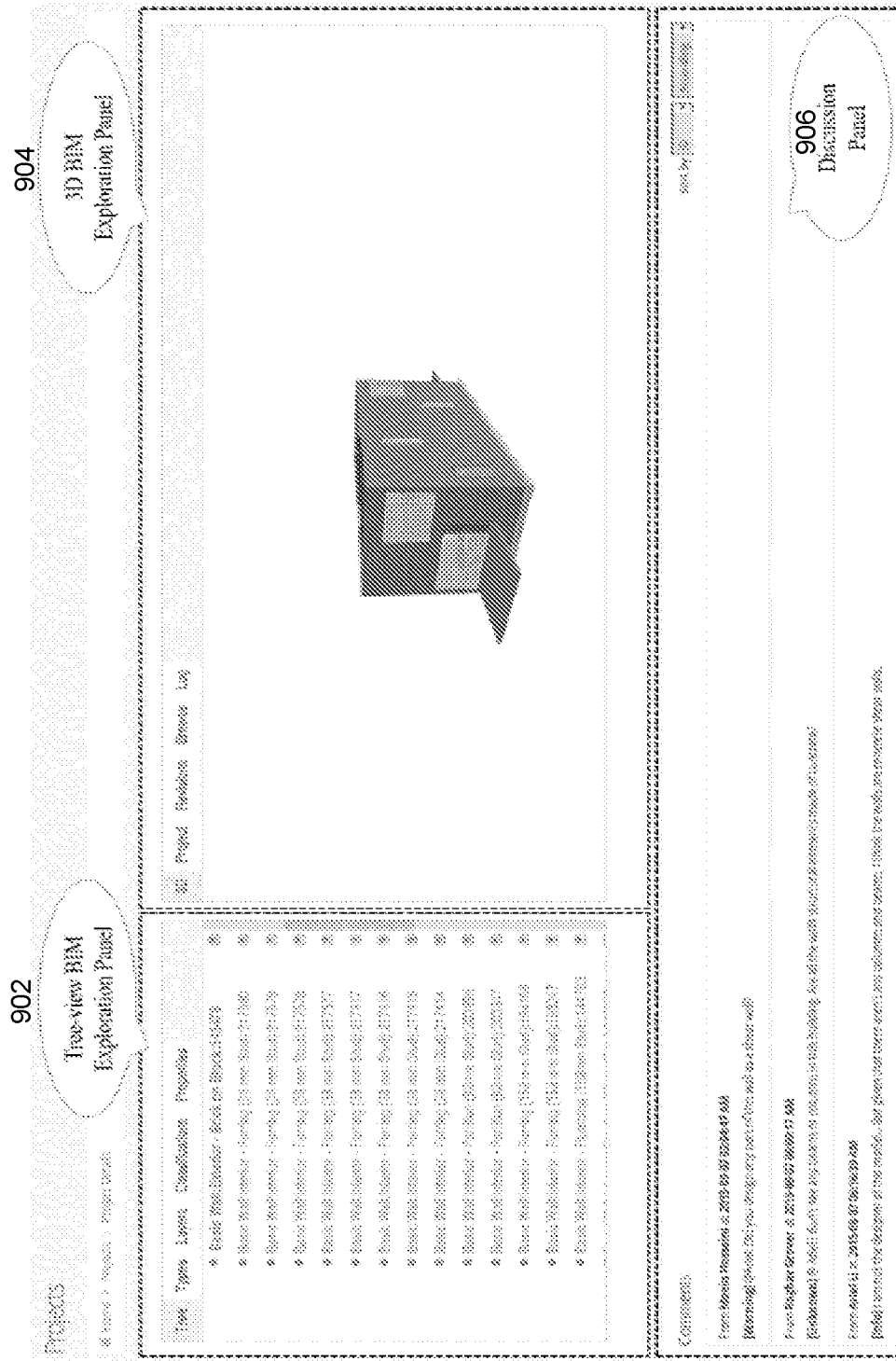
FIG. 9 shows a user interface screen depicting BIM exploration & interaction in the system.

With respect to exploring & Interacting with BIM, once a BIM model is uploaded to the system, a user can visualize it as a 3D model (Block 810 in FIG. 8). The 3D model is interactive, allowing the user to zoom in/out and rotate the model in any direction. Moreover, the user can select a specific BIM element, and explore its properties. The navigation is supported by a tree-like textual hierarchical view. FIG. 9 shows BIM exploration & interaction in the system. A user can explore elements through the 3D visualization (upper right pane 904) or the textual tree-hierarchy (upper left pane 902). Once an element is selected, comments can be submitted (bottom pane 906).

With respect to functionality for sharing BIM Projects and enabling collaboration (Blocks 812 and 814 in FIG. 8), a user can share a project with other users and start collaborating by participating in discussions about BIM elements (see discussion panel in bottom pane 906 in FIG. 9). User feedback allows project owners to update the model in a timely manner and look for further feedback. The outcome of this iterative refinement process is increased coordination due to easy retrieval of information, speed of delivery and reduced costs, therefore improved overall productivity.

With respect to performing Ad Hoc Sustainability Analysis (Block 814 in FIG. 8), a user can interact with the building by substituting specific BIM elements with alternatives that are available in an interactive inventory. Subsequent to utilizing the sustainability analysis module for BIM conversions, the user can also perform ad hoc energy analysis and obtain a detailed report of the energy efficiency of the building in relation to the alternative designs.

With respect to monitoring activity and trends (Block 816 in FIG. 8), utilizing the social interactions module, a user can monitor the collaboration activity and participate as required. A user interface is provided that essentially turns data coming from various sources of interactions into useful information that is summarized and visualized into a dashboard. Furthermore, trending discussions and useful network insights are visualized that can reveal interesting patterns of communication, therefore enhancing monitoring capabilities and better supporting decision making.

In the following, illustrative embodiments of two additional modules of the system 100 will be described. The first, the Business Process Management Module 156, enables monitoring and storing information of all the BIM-related building design processes that take place in system. This particuly refers to critical information, not available in contemporary systems that can lead to further analysis and optimizations of the building design and collaboration processes. The second, the RESTful API Module 158, enables interoperability of the server to third-party services through providing access to resources of the system.

First, referring to the business process management module, one of the long-term objectives of the system is to improve corporate performance by optimizing business processes related to the building design projects. To that end, the Business Process Management (BPM) module operates on processes that become available in the system and supports: storage of the business processes that evolve in the system, monitoring and exploration of business processes, offline analysis of BIM business processes, and access to BIM business processes through a RESTful API (described below).

Figure 10:
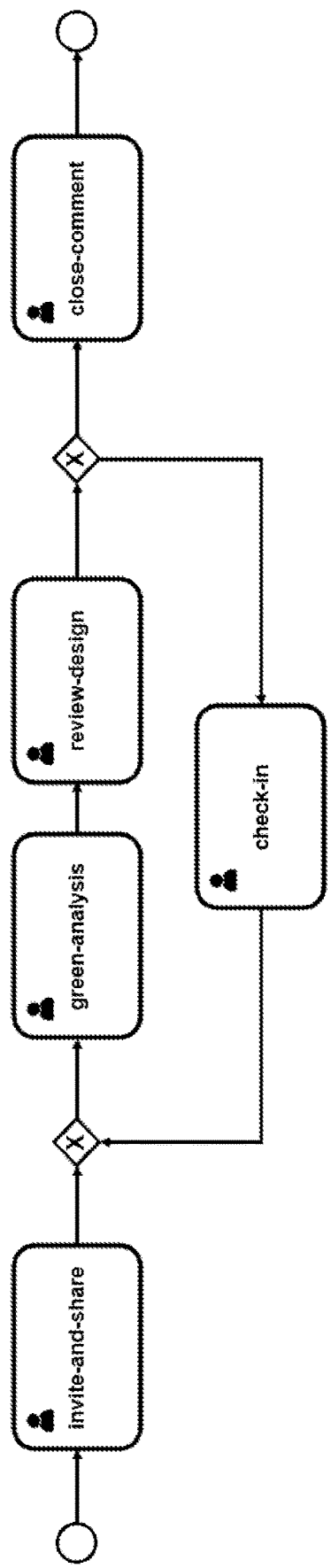
FIG. 10 illustrates an example of the system's business process definition of a business process management module.

The above functionality becomes feasible by integrating the system with a workflow and business process management (BPM) platform, such as with Activiti, an open source light-weight BPM platform. Processes can be designed in Activiti and instantiated in the system. As users perform tasks and interact with each other in the system, Activiti RESTful calls are automatically invoked that inform and update the BPM engine. FIG. 10 illustrates an example the system's business process definition. Multiple process instances are instantiated based on a process definition. As shown, a user initiates a new process instance by creating a new project. The process instance saves information about the project owner, name, description, and creation time. A user then invites other users to comment on her building design and performs a green analysis. Based on the green analysis results and the comments received from other users, the user re-evaluates the design and may (or may not) check-in a new design. If the design is complete, the user stops accepting comments and hence terminates the process instance.

Figure 11:
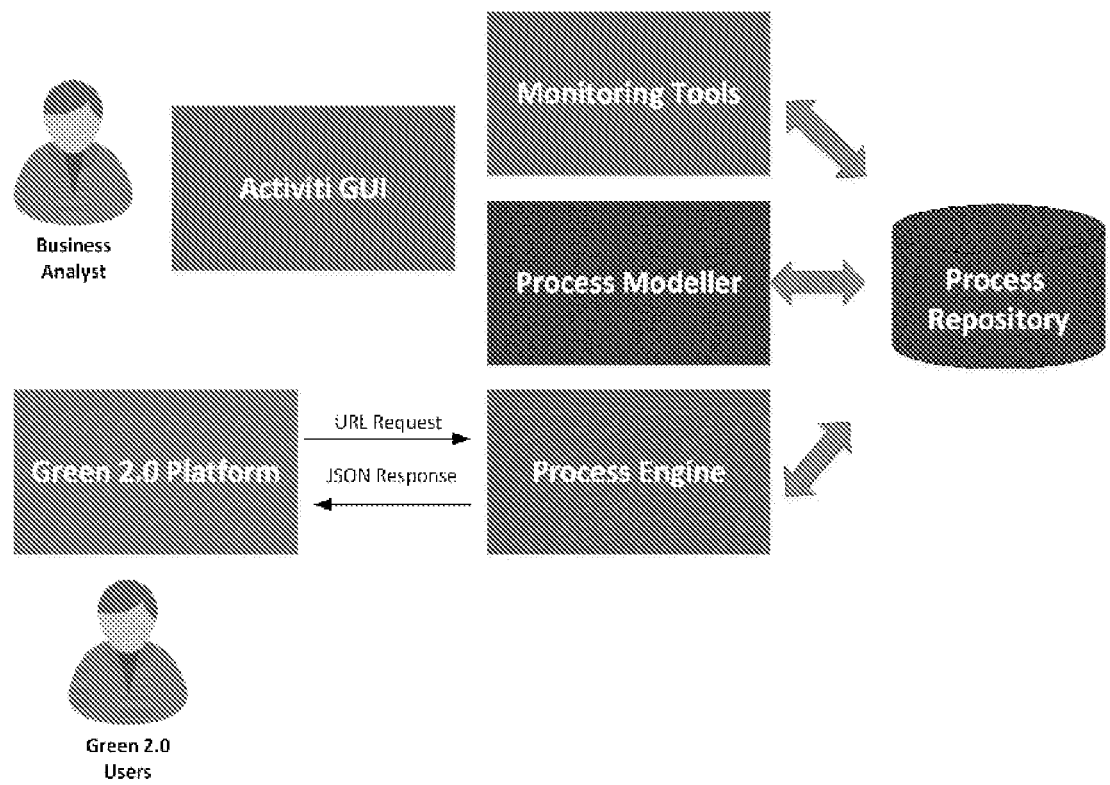
FIG. 11 shows the three main components of an Activiti BPM engine that may be integrated with the system.

The integration of the system and the Activiti BPM engine is of significance, as it provides a repository of all the BIM business processes that took place in the system. This defines an interesting data set as it provides the ability to analyse and optimize BIM business processes offline. FIG. 11 shows the three main components of the Activiti BPM engine that are integrated with the system: process modeller, process engine, and monitoring tools. The process modeller provides the visual design tool required to define a business process, as a collection of interlinked activities achieving a certain goal. Processes are defined using the Business Process Model and Notation (BPMN) standard. The BPMN provides the notation required to communicate process information to business process actors. The process engine is responsible for the execution of the process model defined by the modeller. It keeps track of the different process instances created by the users, the current state of each process instance, data associated with each task/process step, and the history of the user interactions. In addition, the process engine manages execution paths of each process instance by applying the associated business rules identified by business analysts. The monitoring tools component provides metrics about the process such as the number of running processes, number of completed processes, process duration, execution times of activities, and process specific key performance indicators (KPIs). Process metrics allow analysts to measure how the process is performing in general, identify critical tasks, and modify their design accordingly. This module also allows analysts to evaluate and compare possible process design alternatives based on some predefined objectives (e.g. reduce cycle time).

Referring now to RESTful API module, a potential architecture design aspect of the system is to provide access to a cohesive collection of its resources (BI Ms, BIM project information, BIM-enabled networks, etc.) to third-party services and applications. This is accomplished through the design and development of a Representational State Transfer (REST) application programming interface (RESTful API). A RESTful API is an architectural style that uses standard HTTP requests to GET, PUT, POST and DELETE data. Such an API is easily accessible by a variety of HTTP clients, including browsers and mobile devices.

Figure 12:
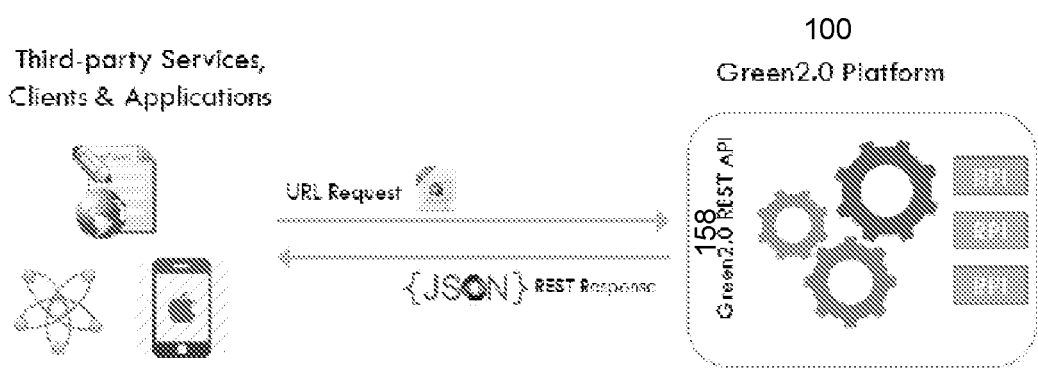
FIG. 12 illustrates a typical architecture for supporting a RESTful API in the system.

FIG. 12 illustrates a typical architecture for supporting a RESTful API in the system. Third-party applications and services are accessing the RESTful API by submitting HTTP requests; the system performs the necessary computation and compiles a REST answer to the request, formatted and served to the requester as a JSON file. Through the API a number of resources become available to third-party services, clients and applications. For easy reference, Table 1 below provides a summary of example system resources that are accessible via the RESTful API through a standard HTTP GET method.

TABLE 1

| Services provided by system via a RESTful API | |
|---|---|
| Service | Description |
| BIM Users | Provides access to BIM users |
| BIM Projects | Provides access to BIM projects |
| BIM IFC Elements | Provides access to IFC elements of given BIM project |
| BIM Comments | Provides access to comments of given BIM project |
| BIM Networks | Provides access to the discussion networks of given BIM project |
| BIM Processes | Provides access to BPM processes |

Briefly summarizing aspects of the system 100, feature-wise, the system 100 provides a service (SaaS) to support interactions (commenting) by stakeholders of a green facility. All participants (professionals and end-users) can share views. To support testing of different design options, a BIM (IFC in particular) is connected to an energy analysis application, e.g. EnergyPlus (through OpenStudio). The proposed methods to transfer IFC data into thermal zones represent a novel method to create a link between BIM and energy analysis systems. In combination, the platform allows for iterative and collaborative testing of alternative building design models potentially leading to more informed, more green decisions.

Researchers have advocated the use of social media to achieve higher levels of active participation of end-users in project design and operations. Further, with the evolution of the knowledge economy, Project Discussion Networks (PDN) are poised to be a source of creative ideas regarding project scope, funding and design/operations plans. Indeed, this could also be the starting point for a new realm in innovation democratization and, more importantly, a bottom-up public decision making. However, the lack of means to analyze these seemingly chaotic discussions wastes these opportunities and is frustrating to end-users, engineers and decision makers. Of similar importance is to streamline the discussions of professionals, which is a salient feature of today's design environment-many disciplines are interacting in facility design and decision making. Through embedding commenting abilities and social network analysis into BIM, we facilitate better flow of the inevitable debate between practitioners. At the same time, we preserve their valuable input for analysis and knowledge harvesting. The premise of the system is that by opening the building design process to the world and providing new insights into the building design process it is likely to have a profound beneficial effect for both the AEC industry and the society at large.

The system defines an interesting and innovative, but complex engineering system for enabling socio-technical analysis and online collaboration capabilities around shared building information models. Moreover, the system optionally adheres to a formal approach of designing an open platform; a platform that can provide open access to information that can help researchers and practitioners to build new, more efficient theories and methods of building design. When one considers how fragmented the AEC industry is, with different disciplines operating different tools and producing distinct models of the construction work; how slow the rate of adoption of standards is; and, the large number of tools that might work well in isolation but do not necessarily provide an easy way to integrate them into third-party services, materializing an open platform that integrates together different technologies for socio-technical analysis of buildings was a major challenge. This system provides a significant improvement over current practice and tries to advance the current state of the art in green building design towards sustainable development.

Although the foregoing has been described with reference to certain specific embodiments, various modifications thereto will be apparent to those skilled in the art without departing from the spirit and scope of the invention as outlined in the appended claims. Particularly, although the foregoing has been described with reference to BIM, the systems and methods described herein may be applied in other contexts where geometry transformation and social network analysis are required. The entire disclosures of all references recited above are incorporated herein by reference.

The invention claimed is:

1. A method for transforming a BIM (building information model) from a decomposition of individual components with solid-volume geometrical representations to thermal zones for use in energy analysis, the method comprising:
   receiving a BIM;
   transforming the BIM to flatten solid-volume geometry for space bounding elements into thin-walled boundaries of the thermal zones by:
      determining wall volumes from the BIM;
      collapsing the wall volumes to provide single surface walls;
      determining wall center surfaces and end points from the single surface walls;
      aligning and trimming the single surface walls using the wall end points to create closed spaces, wherein trimming the single surface walls using the wall end points to create closed spaces comprises constructing halfspace solids from the wall center surfaces to be used to trim the single surface walls, the halfspace solid is a solid that divides a Cartesian space into two sets on either side of the single surface wall;
      connecting the closed spaces vertically to generate a single water tight volume for the closed spaces; and
      creating interfaces between the single water tight volume for the closed spaces to generate thermal zones; and
   outputting the thermal zones.

2. The method of claim 1, wherein the BIM model is received in IFC format.

3. The method of claim 1, further comprising receiving a selection of a subset of the BIM for transforming.

4. The method of claim 1, further comprising determining any openings of the wall volumes and generating subsurfaces for the determined openings to approximate for the detailed geometry of wall openings.

5. The method of claim 1, wherein outputting the thermal zones comprises displaying the thermal zones to a user.

6. The method of claim 5, further comprising displaying to the user at least one of the wall volumes, the single surface walls, the wall center surfaces and end points, the create closed spaces, and the single water tight volume.

7. The method of claim 1, wherein connecting the closed spaces vertically to generate the single water tight volume comprises constructing a plurality of slabs each bounded by projections of boundaries of the single surface walls.

8. The method of claim 7, further comprising collapsing the slabs to provide single surface slab faces.

9. The method of claim 7, wherein extending of the single surface walls comprises extending the single surface walls in at least one of the vertical and horizontal planes.

10. A system for transforming a BIM (building information model) from a decomposition of individual components with solid-volume geometrical representations to thermal zones for use in energy analysis, the system comprising a processing unit and storage unit, the processing unit being configured to:
   receive a BIM from the storage unit;
   transform the BIM to flatten solid-volume geometry for space bounding elements into thin-walled boundaries of the thermal zones by:
      determining wall volumes from the BIM;
      collapsing the wall volumes to provide single surface walls;
      determining wall center surfaces and end points from the single surface walls;
      aligning and trimming the single surface walls using the wall end points to create closed spaces, wherein trimming the single surface walls using the wall end points to create closed spaces comprises constructing halfspace solids from the wall center surfaces to be used to trim the single surface walls, the halfspace solid is a solid that divides a Cartesian space into two sets on either side of the single surface wall;
      connecting the closed spaces vertically to generate a single water tight volume for the closed spaces; and
      creating interfaces between the single water tight volume for the closed spaces to generate thermal zones; and
   output the thermal zones.

11. The system of claim 10, wherein the BIM model is received in IFC format.

12. The system of claim 10, wherein the processing unit is further configured to receive a selection of a subset of the BIM for transforming.

13. The system of claim 10, wherein the processing unit is further configured to determine any openings of the wall volumes and generating subsurfaces for the determined openings to approximate for the detailed geometry of wall openings.

14. The system of claim 10, wherein outputting the thermal zones comprises displaying the thermal zones to a user via a user device.

15. The system of claim 14, wherein the processing unit is further configured to output and display to the user, via the user device, at least one of the wall volumes, the single surface walls, the wall center surfaces and end points, the create closed spaces, and the single water tight volume.

16. The system of claim 10, wherein connecting the closed spaces vertically to generate the single water tight volume comprises constructing a top slab and a bottom slab each bounded by projections of boundaries of the single surface walls.

17. The system of claim 16, the processing unit is further configured to collapse the slabs to provide single surface slab faces.

18. The system of claim 10, wherein extending of the single surface walls comprises extending the single surface walls in at least one of the vertical and horizontal planes.

* * * * *